United States Patent
Kursun et al.

(10) Patent No.: US 10,628,571 B2
(45) Date of Patent: Apr. 21, 2020

(54) SYSTEMS AND METHODS FOR HIGH FIDELITY MULTI-MODAL OUT-OF-BAND BIOMETRIC AUTHENTICATION WITH HUMAN CROSS-CHECKING

(71) Applicant: JPMorgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/262,015

(22) Filed: Jan. 30, 2019

(65) Prior Publication Data

US 2019/0163891 A1    May 30, 2019

Related U.S. Application Data

(63) Continuation of application No. 13/972,556, filed on Aug. 21, 2013, now Pat. No. 10,235,508, which is a
(Continued)

(51) Int. Cl.
*G06F 21/32* (2013.01)
*G06Q 30/00* (2012.01)

(52) U.S. Cl.
CPC .............. *G06F 21/32* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 5,072,294 A * | 12/1991 | Engle | G06K 9/3216 348/172 |
| 5,229,764 A | 7/1993 | Matchett | |

(Continued)

FOREIGN PATENT DOCUMENTS

| | | |
|---|---|---|
| EP | 2560123 | 2/2013 |
| WO | WO 2008/055181 | 5/2008 |

(Continued)

OTHER PUBLICATIONS

Sung Joo Lee, Kang Ryoung Park, Youn Joo Lee, Kwanghyuk Bae and Jaihie Kim, Multifeatrue-based fake iris detection method, SPIE, Optical Engineering, vol. 46, Issue 12, Dec. 2007, pp. 1-10 (Year: 2007).

(Continued)

*Primary Examiner* — Steven Lim
*Assistant Examiner* — Muhammad Adnan
(74) *Attorney, Agent, or Firm* — Greenberg Traurig LLP

(57) ABSTRACT

Systems and methods for high fidelity multi-modal out-of-band biometric authentication with cross-checking are disclosed. According to one embodiment, a method for integrated biometric authentication may include (1) receiving, from a user, biometric data; (2) at least one computer processor performing machine-based biometric matching on the biometric data; (3) the at least one computer processor determining that human identity confirmation is necessary; (4) the at least one computer processor processing the biometric data; (5) the at least one computer processor identifying at least one contact for human identity confirmation; (6) the at least one computer processor sending at least a portion of the processed biometric data for the user to the at least one contact; (7) receiving, from the at least one contact, human confirmation information; and (8) the at least one computer processor authenticating the user based on the machine-based biometric matching and the human confirmation information.

19 Claims, 22 Drawing Sheets

Related U.S. Application Data continuation-in-part of application No. 13/908,618, filed on Jun. 3, 2013, now Pat. No. 9,760,785.

(60) Provisional application No. 61/860,475, filed on Jul. 31, 2013, provisional application No. 61/823,669, filed on May 15, 2013, provisional application No. 61/820,917, filed on May 8, 2013.

(56) References Cited

U.S. PATENT DOCUMENTS

| | | | | |
|---|---|---|---|---|
| 5,648,648 | A * | 7/1997 | Chou | G07C 9/00158 |
| | | | | 235/375 |
| 5,679,940 | A * | 10/1997 | Templeton | G06Q 20/04 |
| | | | | 235/375 |
| 5,708,422 | A * | 1/1998 | Blonder | G06Q 20/40 |
| | | | | 340/5.41 |
| 6,327,348 | B1 * | 12/2001 | Walker | G06Q 20/04 |
| | | | | 235/380 |
| 6,532,459 | B1 | 3/2003 | Berson | |
| 6,697,942 | B1 | 2/2004 | L'Heureux et al. | |
| 7,080,046 | B1 * | 7/2006 | Rezvani | G06F 21/31 |
| | | | | 705/26.1 |
| 7,117,365 | B1 | 10/2006 | Rump et al. | |
| 7,174,323 | B1 | 2/2007 | Schultz et al. | |
| 7,330,570 | B2 | 2/2008 | Sogo | |
| 7,360,239 | B2 | 4/2008 | Mandalia et al. | |
| 7,454,470 | B1 * | 11/2008 | Isaacs | G06Q 10/107 |
| | | | | 709/206 |
| 7,523,067 | B1 * | 4/2009 | Nakajima | G06Q 20/10 |
| | | | | 705/39 |
| 7,707,108 | B2 * | 4/2010 | Brown | G06Q 20/04 |
| | | | | 235/379 |
| 7,986,816 | B1 | 7/2011 | Hoanca et al. | |
| 8,028,896 | B2 | 10/2011 | Carter et al. | |
| 8,065,175 | B1 | 11/2011 | Lewis | |
| 8,127,982 | B1 * | 3/2012 | Casey | G06Q 20/35785 |
| | | | | 235/379 |
| 8,191,126 | B2 | 5/2012 | Raghavan | |
| 8,224,727 | B2 * | 7/2012 | Hirson | G06Q 20/10 |
| | | | | 705/35 |
| 8,326,261 | B2 * | 12/2012 | Smith | H04L 12/14 |
| | | | | 455/406 |
| 8,355,987 | B2 * | 1/2013 | Hirson | G06Q 20/023 |
| | | | | 705/40 |
| 8,583,496 | B2 * | 11/2013 | Yoo | G06Q 20/10 |
| | | | | 705/17 |
| 8,606,611 | B1 | 12/2013 | Fedorov | |
| 8,662,384 | B2 * | 3/2014 | Dodin | G06Q 20/02 |
| | | | | 235/378 |
| 8,699,994 | B2 * | 4/2014 | Kim | G06O 30/0601 |
| | | | | 455/406 |
| 8,700,524 | B2 * | 4/2014 | Williams | H04W 4/24 |
| | | | | 705/318 |
| 8,724,910 | B1 | 5/2014 | Pillai | |
| 8,751,393 | B1 | 6/2014 | Murray et al. | |
| 8,762,216 | B1 * | 6/2014 | Bhosle | G06Q 40/02 |
| | | | | 705/26.1 |
| 8,892,461 | B2 | 11/2014 | Lau et al. | |
| 8,972,741 | B2 | 3/2015 | Awatsu et al. | |
| 8,977,567 | B2 * | 3/2015 | Aabye | G06Q 20/10 |
| | | | | 705/39 |
| 8,984,276 | B2 | 3/2015 | Benson et al. | |
| 9,152,868 | B2 * | 10/2015 | Smowton | H01L 9/3231 |
| 9,280,715 | B2 | 3/2016 | Stephanson | |
| 9,384,270 | B1 * | 7/2016 | Jay | G06Q 20/40 |
| 9,442,467 | B1 * | 9/2016 | Behbehani | G05B 1/01 |
| 9,461,955 | B1 | 10/2016 | Sherrets | |
| 9,760,885 | B1 * | 9/2017 | Ramalingam | H04W 4/029 |
| 2001/0036300 | A1 * | 11/2001 | Xia | G06K 9/00067 |
| | | | | 382/125 |
| 2002/0138742 | A1 | 9/2002 | Hamid | |
| 2002/0140542 | A1 | 10/2002 | Prokoski | |
| 2002/0174344 | A1 | 11/2002 | Ting | |
| 2002/0180586 | A1 | 12/2002 | Kitson et al. | |
| 2002/0198731 | A1 * | 12/2002 | Barnes | G06Q 50/265 |
| | | | | 705/325 |
| 2003/0031348 | A1 | 2/2003 | Kuepper et al. | |
| 2003/0046228 | A1 | 3/2003 | Berney | |
| 2003/0172027 | A1 * | 9/2003 | Scott | G06F 21/10 |
| | | | | 705/39 |
| 2003/0210808 | A1 | 11/2003 | Chen | |
| 2004/0024694 | A1 * | 2/2004 | Lawrence | G06Q 20/10 |
| | | | | 705/38 |
| 2004/0083265 | A1 | 4/2004 | Beringer | |
| 2004/0098481 | A1 | 5/2004 | Gunji | |
| 2004/0104266 | A1 * | 6/2004 | Bolle | G06F 21/6245 |
| | | | | 235/382 |
| 2004/0111313 | A1 | 6/2004 | Ingman | |
| 2004/0194980 | A1 * | 10/2004 | McSheffrey, Jr. | G08B 25/10 |
| | | | | 169/75 |
| 2004/0199663 | A1 | 10/2004 | Horvitz | |
| 2004/0228504 | A1 | 11/2004 | Chang | |
| 2005/0018883 | A1 | 1/2005 | Scott | |
| 2005/0063569 | A1 | 3/2005 | Colbert et al. | |
| 2005/0108351 | A1 | 5/2005 | Naick | |
| 2005/0138391 | A1 * | 6/2005 | Mandalia | H04L 63/0861 |
| | | | | 713/186 |
| 2005/0144560 | A1 | 6/2005 | Gruen | |
| 2005/0160052 | A1 * | 7/2005 | Schneider | G06F 21/32 |
| | | | | 705/67 |
| 2005/0195077 | A1 * | 9/2005 | McCulloch | G06F 17/2229 |
| | | | | 340/500 |
| 2005/0204001 | A1 | 9/2005 | Stein | |
| 2005/0231354 | A1 * | 10/2005 | Riedel | A61N 1/39 |
| | | | | 340/531 |
| 2006/0000896 | A1 | 1/2006 | Bonalle et al. | |
| 2006/0010217 | A1 | 1/2006 | Sood | |
| 2006/0016872 | A1 | 1/2006 | Bonalle et al. | |
| 2006/0095369 | A1 | 5/2006 | Hofi | |
| 2006/0206723 | A1 | 9/2006 | Gil et al. | |
| 2006/0227997 | A1 | 10/2006 | Au et al. | |
| 2006/0248344 | A1 | 11/2006 | Yang | |
| 2006/0259778 | A1 * | 11/2006 | Gudorf | G06F 21/33 |
| | | | | 713/186 |
| 2007/0169182 | A1 * | 7/2007 | Wolfond | G06F 21/31 |
| | | | | 726/7 |
| 2007/0271341 | A1 | 11/2007 | Kumar | |
| 2007/0283142 | A1 * | 12/2007 | Milstein | H04L 63/08 |
| | | | | 713/155 |
| 2008/0021919 | A1 * | 1/2008 | Kaartinen | G06Q 10/087 |
| 2008/0077660 | A1 | 3/2008 | Tomida | |
| 2008/0081231 | A1 * | 4/2008 | Kurita | H01M 8/04223 |
| | | | | 429/423 |
| 2008/0101658 | A1 | 5/2008 | Ahern | |
| 2008/0108261 | A1 * | 5/2008 | Swan | B63C 9/0005 |
| | | | | 441/89 |
| 2008/0126951 | A1 | 5/2008 | Sood | |
| 2008/0253622 | A1 * | 10/2008 | Tosa | G06K 9/00604 |
| | | | | 382/117 |
| 2008/0302870 | A1 * | 12/2008 | Berini | G07O 9/00087 |
| | | | | 235/380 |
| 2009/0132662 | A1 | 5/2009 | Sheridan | |
| 2009/0182822 | A1 | 7/2009 | O'Sullivan | |
| 2009/0222913 | A1 * | 9/2009 | Fujii | G06Q 10/06 |
| | | | | 726/20 |
| 2009/0252383 | A1 * | 10/2009 | Adam | G06K 9/00288 |
| | | | | 382/118 |
| 2009/0265106 | A1 * | 10/2009 | Bearman | G06Q 10/00 |
| | | | | 701/300 |
| 2009/0282493 | A1 | 11/2009 | Bhide | |
| 2010/0010370 | A1 | 1/2010 | De Lemos et al. | |
| 2010/0011428 | A1 * | 1/2010 | Atwood | G06Q 20/40 |
| | | | | 726/7 |
| 2010/0017484 | A1 | 1/2010 | Accapadi | |
| 2010/0030798 | A1 | 2/2010 | Kumar et al. | |
| 2010/0060417 | A1 | 3/2010 | Niinuma | |
| 2010/0067745 | A1 | 3/2010 | Kovtun et al. | |
| 2010/0169958 | A1 | 7/2010 | Werner et al. | |
| 2010/0228692 | A1 | 9/2010 | Guralnik et al. | |

(56) References Cited

U.S. PATENT DOCUMENTS

| | | |
|---|---|---|
| 2010/0251359 A1 | 9/2010 | Shirai |
| 2010/0268754 A1* | 10/2010 | Holton .................. G06Q 10/107 |
| | | 709/203 |
| 2010/0286993 A1* | 11/2010 | Lovelace ............... G06Q 30/00 |
| | | 705/2 |
| 2010/0287382 A1 | 11/2010 | Gyorffy et al. |
| 2010/0321156 A1* | 12/2010 | Pitt ......................... G06F 21/32 |
| | | 340/5.82 |
| 2011/0007949 A1 | 1/2011 | Hanna et al. |
| 2011/0072039 A1* | 3/2011 | Tayloe ................ G06F 21/6218 |
| | | 707/769 |
| 2011/0072510 A1 | 3/2011 | Cheswick |
| 2011/0076988 A1* | 3/2011 | Zigman ............... G07C 9/00031 |
| | | 455/411 |
| 2011/0178962 A1 | 7/2011 | Sood |
| 2011/0208716 A1 | 8/2011 | Liu et al. |
| 2012/0023574 A1 | 1/2012 | Osborn et al. |
| 2012/0068820 A1 | 3/2012 | Millicone |
| 2012/0144498 A1* | 6/2012 | Buhrmann ......... G06Q 20/4014 |
| | | 726/26 |
| 2012/0151377 A1 | 6/2012 | Schultz et al. |
| 2012/0157042 A1* | 6/2012 | McCanna ........... H04L 12/1414 |
| | | 455/407 |
| 2012/0158798 A1 | 6/2012 | Patil |
| 2012/0167199 A1 | 6/2012 | Riddiford |
| 2012/0169461 A1 | 7/2012 | Dubois, Jr. |
| 2012/0173631 A1 | 7/2012 | Yoakum |
| 2012/0200567 A1 | 8/2012 | Mandel |
| 2012/0204035 A1 | 8/2012 | Camenisch et al. |
| 2012/0238234 A1* | 9/2012 | Duarte ..................... G06Q 50/01 |
| | | 455/404.1 |
| 2012/0255995 A1* | 10/2012 | Ahmed ................ G06Q 20/204 |
| | | 235/380 |
| 2012/0259783 A1* | 10/2012 | Kemper ................. G06Q 20/04 |
| | | 705/44 |
| 2012/0291120 A1 | 11/2012 | Griffin |
| 2012/0319817 A1 | 12/2012 | Abe |
| 2013/0023240 A1* | 1/2013 | Weiner .................. H04W 12/06 |
| | | 455/411 |
| 2013/0055362 A1 | 2/2013 | Rathbun |
| 2013/0091540 A1* | 4/2013 | Chen ........................ H04W 4/21 |
| | | 726/1 |
| 2013/0117059 A1 | 5/2013 | Norton et al. |
| 2013/0138746 A1 | 5/2013 | Tardelli |
| 2013/0251216 A1* | 9/2013 | Smowton .............. H04L 9/3231 |
| | | 382/118 |
| 2013/0262333 A1* | 10/2013 | Wicker ................ G06O 50/265 |
| | | 705/325 |
| 2013/0268775 A1 | 10/2013 | Hawkins |
| 2013/0282589 A1* | 10/2013 | Shoup ..................... G06F 21/34 |
| | | 705/67 |
| 2013/0340061 A1 | 12/2013 | Tsukamoto |
| 2013/0346067 A1 | 12/2013 | Bhatt |
| 2014/0002238 A1* | 1/2014 | Taveau ............... G07C 9/00087 |
| | | 340/5.53 |
| 2014/0007185 A1 | 1/2014 | Han et al. |
| 2014/0007224 A1* | 1/2014 | Lu ........................ H04L 9/3231 |
| | | 726/19 |
| 2014/0009560 A1* | 1/2014 | Krishnan .............. H04M 3/436 |
| | | 348/14.03 |
| 2014/0055553 A1* | 2/2014 | Lee ..................... G06K 9/00288 |
| | | 348/14.07 |
| 2014/0089242 A1 | 3/2014 | Lynar |
| 2014/0095363 A1* | 4/2014 | Caldwell ............... G06Q 20/10 |
| | | 705/35 |
| 2014/0096196 A1 | 4/2014 | O'Connor |
| 2014/0137221 A1 | 5/2014 | Dominic et al. |
| 2014/0181956 A1 | 6/2014 | Ahn et al. |
| 2014/0268243 A1 | 9/2014 | Mitsubori |
| 2014/0270404 A1 | 9/2014 | Hanna |
| 2014/0324999 A1 | 10/2014 | Dan |
| 2014/0330729 A1* | 11/2014 | Colangelo ........ G06Q 20/40145 |
| | | 705/72 |
| 2014/0347479 A1 | 11/2014 | Givon |
| 2014/0363058 A1* | 12/2014 | Emmett ............... G06K 9/0061 |
| | | 382/117 |
| 2015/0039527 A1* | 2/2015 | Hanna .................. G06Q 50/265 |
| | | 705/325 |
| 2015/0200899 A1 | 7/2015 | Sanketi |
| 2017/0039890 A1* | 2/2017 | Truong ................ G09B 19/167 |
| 2018/0098220 A1* | 4/2018 | Frank ..................... H04L 63/00 |
| 2018/0182052 A1* | 6/2018 | Panagos ............... G06Q 50/265 |

FOREIGN PATENT DOCUMENTS

| | | |
|---|---|---|
| WO | WO 2009/067738 | 6/2009 |
| WO | WO 2012/164385 | 12/2012 |
| WO | WO 2012173655 | 12/2012 |

OTHER PUBLICATIONS

European Patent Office Communication and Supplementary European Search Report, European Patent Application No. 14794941.6, dated Nov. 18, 2016, pp. 1-8.

Notification of Trnasmittal of the International Search report and The Written Opinion of The International Searching Authority, or The Declaration (PCT/US2014/048822), dated Nov. 24, 2014.

International Search Report (PCT/US2014/048822), dated Nov. 24, 2014.

Written Opinion of The International Searching Authority (PCT/US2014/048822), dated Nov. 24, 2014.

Notification of Transmittal of the International Search Report and The Written Opinion of the International Searching Authority, or the Declaration, dated Dec. 9, 2014.

International Search Report, dated Dec. 9, 2014.

Written Opinion of the International Searching Authority, dated Dec. 9, 2014.

* cited by examiner

SYSTEMS AND METHODS FOR HIGH FIDELITY MULTI-MODAL OUT-OF-BAND BIOMETRIC AUTHENTICATION WITH HUMAN CROSS-CHECKING

RELATED APPLICATIONS

This patent application is a continuation of U.S. patent application Ser. No. 13/972,556, filed Aug. 21, 2013, now U.S. Pat. No. 10,235,508, which is a continuation in part of U.S. patent application Ser. No. 13/908,618, filed Jun. 3, 2013, now U.S. Pat. No. 9,760,785. It also claims priority to U.S. Provisional Patent Application Ser. No. 61/860,475, filed Jul. 31, 2013, U.S. Provisional Patent Application Ser. No. 61/820,917, filed May 8, 2013, and U.S. Provisional Patent Application Ser. No. 61/823,669, filed May 15, 2013. It is also related to U.S. patent application Ser. No. 13/940,799, filed Jul. 12, 2013 and U.S. Provisional Patent Application Ser. No. 61/844,097, filed Jul. 9, 2013. The disclosure of each of these patent applications is hereby incorporated, by reference, in its entirety.

BACKGROUND OF THE INVENTION

1. Field of the Invention

The present invention generally relates to biometric authentication and, more particularly, to systems and methods for high fidelity multi-modal out-of-band biometric authentication with human cross-checking.

2. Description of the Related Art

To access a company network or website, users generally enter a user name and password. A similar approach may be used when a user attempts to access an on-line account that the user may have with, for example, a financial institution, service/utility provider, etc.

SUMMARY OF THE INVENTION

Systems and methods for high fidelity multi-modal out-of-band biometric authentication with cross-checking are disclosed.

According to one embodiment, a method for integrated biometric authentication is disclosed. The method may include (1) receiving, from a user, biometric data; (2) at least one computer processor performing machine-based biometric matching on the biometric data; (3) the at least one computer processor determining that human identity confirmation is necessary; (4) the at least one computer processor processing the biometric data; (5) the at least one computer processor identifying at least one contact for human identity confirmation; (6) the at least one computer processor sending at least a portion of the processed biometric data for the user to the at least one contact; (7) receiving, from the at least one contact, human confirmation information; and (8) the at least one computer processor authenticating the user based on the machine-based biometric matching and the human confirmation information.

In one embodiment, the machine-based biometric matching may include the at least one computer processor using at least one algorithm to compare the biometric data to a stored biometric profile for the user.

In one embodiment, the step of determining that human identity confirmation is necessary may include the at least one computer processor determining a reliability of at least one algorithm in comparing the biometric data to a stored biometric profile of the user; and the at least one computer processor initiating human identity confirmation in response to the reliability of at least one algorithm being below a predetermined threshold.

In another embodiment, the step of determining that human identity confirmation is necessary may include: the at least one computer processor determining the risk or value of a transaction associated with the authentication; and the at least one computer processor initiating human identity confirmation in response to the risk or value being above a predetermined threshold.

In one embodiment, the step of determining that human identity confirmation is necessary may include the at least one computer processor determining the presence of an anomaly in the biometric data.

In one embodiment, the step of processing the biometric data may include the at least one computer processor removing background data from the biometric data.

In another embodiment, the step of processing the biometric data may include the at least one computer processor removing background noise from the biometric data.

In another embodiment, the step of processing the biometric data may include the at least one computer processor removing non-biometric data from the biometric data.

In another embodiment, the step of processing the biometric data may include the at least one computer processor generating at least one snippet from the biometric data.

In one embodiment, the at least one snippet comprises biometric data from a portion of the user's face, biometric data from a portion of a voice submission from the user, etc.

In another embodiment, the at least one snippet is generated based on at least one machine-created marker flag.

In another embodiment, the step of identifying at least one contact for human identity confirmation may include the at least one computer processor retrieving a confirmation list for the user, the contact list comprising an identity and contact information for contacts known to the user.

In one embodiment, the confirmation list may be automatically generated based on connectivity information for the user.

In one embodiment, each individual on the confirmation list may be associated with a connectivity score based on the contact's connection with the user.

In another embodiment, each contact on the confirmation list may be further associated with a confidence factor based on the individual's history of confirmation.

In one embodiment, the step of receiving, from the at least one contact, human confirmation information may include receiving a response and a response confidence level from the contact.

In one embodiment, the step of authenticating the user based on the machine-based biometric matching and the human confirmation information may include the at least one computer processor weighting each response based on at least one of a connectivity score for the contact and the response confidence level.

A method for factoring in determining a weighting to give to a biometric authentication process is disclosed. According to one embodiment, the method may include (1) retrieving historical data related to a detection technique used to detect fraudulent access attempts using biometric data for a modality; (2) at least one computer processor determining an effectiveness of the detection technique; and (3) at least one computer processor generating a weighting factor for the modality.

In one embodiment, the historical data may include experimental data.

In one embodiment, the detection technique may be a machine-based detection technique.

In one embodiment, the detection technique may be a human-based detection technique.

A method for multi-party authentication is disclosed. According to one embodiment, the method may include (1) receiving, from a first party, a request for authentication and first party biometric data; (2) at least one computer processor machine authenticating the first party using the first party biometric data; (3) receiving, from a second party, a request for authentication and second party biometric data; (4) the at least one computer processor machine authenticating the second party using the second party biometric data; (5) the at least one computer processor processing the first party biometric data; (6) the at least one computer processor sending at least a portion of the processed first party biometric data to the second party; (7) receiving, from the second party, second party confirmation information for the first party; and (8) the at least one computer processor authenticating the first party based on the machine authentication of the first party and the second party confirmation information for the first party.

In one embodiment, the method may further include receiving, from a third party, a request for authentication and third party biometric data; the at least one computer processor machine authenticating the third party using the second party third data; the at least one computer processor processing the second party biometric data; the at least one computer processor sending at least a portion of the processed second party biometric data to the third party; receiving, from the third party, third party confirmation information for the second party; and the at least one computer processor authenticating the second party based on the machine authentication of the second party and the third party confirmation information for the second party.

In one embodiment, the method may further include: the at least one computer processor sending at least a portion of the processed second party biometric data to a fourth party; receiving, from the fourth party, fourth party confirmation information for the second party; and the at least one computer processor further authenticating the second party based on the machine authentication of the second party and the fourth party confirmation information for the second party.

According to one embodiment, systems and methods that incorporate human and computer verification for biometrics authentication session are disclosed.

According to one embodiment, the method may include the generation of snippets out of biometrics authentication sessions based on human cognitive capabilities.

According to one embodiment, a technique that may identify a custom length of snippet for modality and authentication session is disclosed.

According to one embodiment, a technique that may determine number and connectivity scores in the confirmation list to send the snippets to is disclosed. According to one embodiment, a technique that may determine which snippet to send to whom based on their game scores is disclosed.

According to one embodiment, privacy filtering of snippets for human verification is disclosed.

According to one embodiment, connectivity-weight based distribution of snippets to known/unknown parties is disclosed.

According to one embodiment, a graph database system that stores and maintains a confirmation list with connectivity, verification profiles of users is disclosed.

According to one embodiment, mobile/personal/desktop widget based real-time distribution and response collection of snippets is disclosed.

According to one embodiment, connectivity and confidence score based evaluation of received responses is disclosed.

According to one embodiment, a technique to calculate connectivity confidence scores of human reviewers based on geolocation, work/personal connectivity, authentication history, currency of connection, etc. is disclosed.

According to one embodiment, the calculation of overall confidence and spoof risk scores for authentication session based on human and computer paths is disclosed.

According to one embodiment, "gamification" interfaces for the distribution and evaluation of biometrics session data are disclosed.

According to one embodiment, gamification-based rankings of success rates for human verifies for spoof identification are disclosed.

According to one embodiment, point collection for identifying spoofs through gamification interface is disclosed.

According to one embodiment, confidence checking techniques based on gamification and ranking scores are disclosed.

According to one embodiment, the identification of common potential spoof markers based on confidence scores and comments from responders through gamification interface is disclosed.

According to one embodiment, techniques to analyze spoofing risk factors for human and machine biometrics authentication paths for individual modalities and markers are disclosed.

According to one embodiment, techniques to merge confidence scores from human and machine-based biometrics authentication paths are disclosed.

According to one embodiment, techniques to cross verify chain of users in authentication path for high security applications are disclosed.

According to one embodiment, circular verification of biometrics with external reviewers is disclosed.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
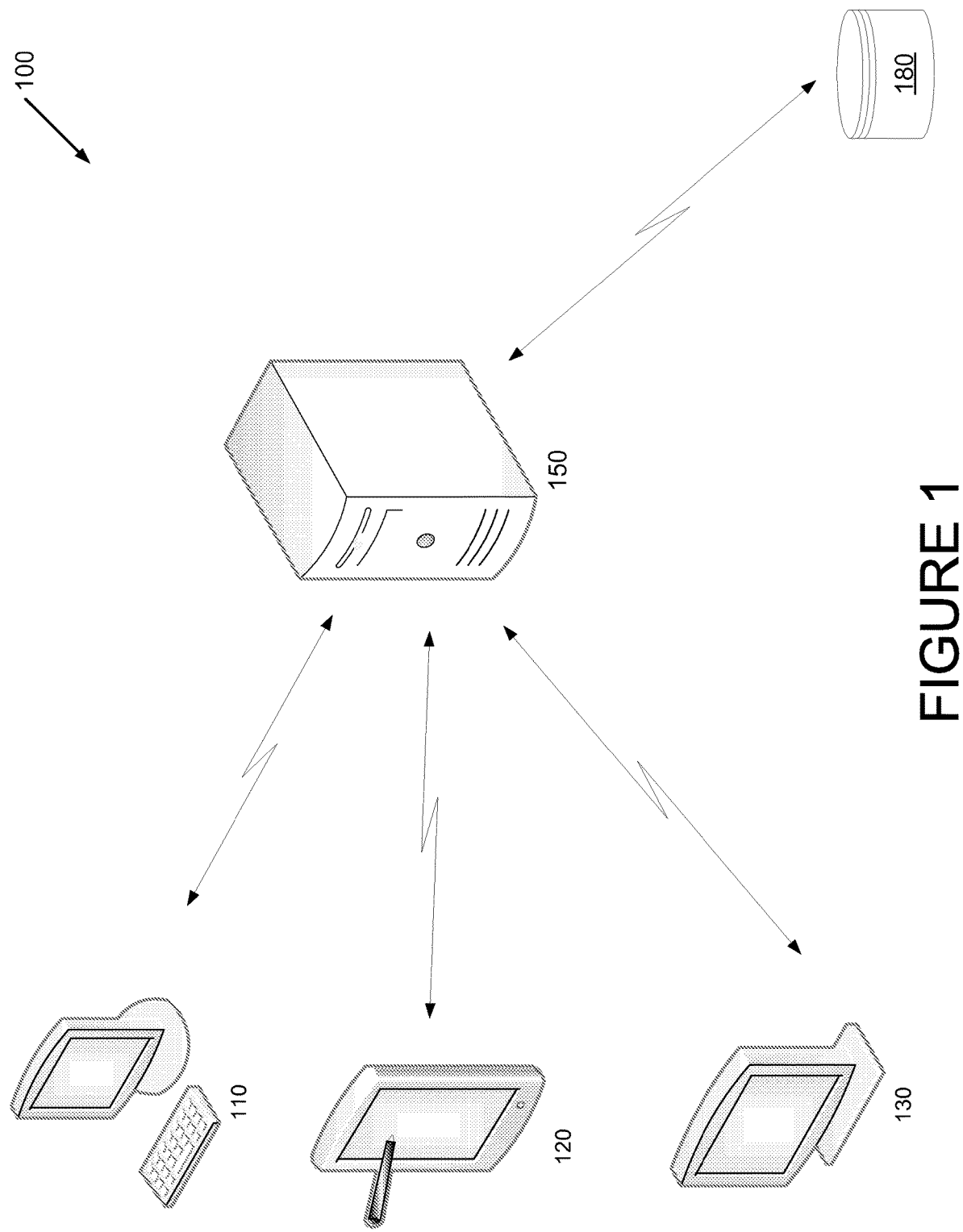
FIG. 1 is a block diagram of a system for high fidelity multi-modal out-of-band biometric authentication according to one embodiment.

Several embodiments of the present invention and their advantages may be understood by referring to FIGS. 1-20, wherein like reference numerals refer to like elements.

Embodiments of the invention relate to a biometrics authentication process. This authentication may be used, for example, if a user seeks to access a network, to sign-in to an account, to authorize a certain transaction (e.g., a high risk/value transaction), to authorize access to a computer application, such as a mobile application, a computer program, etc. In one embodiment, a mobile device may be used to authenticate a user's access to an account on a desktop computer. For example, a code, such as a QR code, may be displayed on the screen of the desktop computer on which the user is seeking to access an account, conduct a transaction, etc. Using the user's registered mobile device, the user may "simultaneously" (i.e., within a predetermined short time period, such as 5 seconds) scan the QR code with the front-facing camera, take an image of the user's face, facial features (e.g., eyes, irises, etc.) with the rear-facing camera, and speak a verbal password for the microphone. The server may authenticate the user based on all three entries (e.g., code, facial image, voice biometric, etc.).

Other biometrics, such as iris recognition (using the rear-facing camera), finger print, retinal scan, DNA sample, palm print, hand geometry, odor/scent, gait, etc. may be used. In one embodiment, infrared cameras may be used to capture a user's thermal signature.

To authenticate a user using a mobile device in the absence of a desktop, a QR code may not be used. Facial recognition and a biometric, however, may still be entered "simultaneously." Other inputs, including gestures, touch patterns, etc. may be used as necessary and/or desired.

During the voice registration process, the server may record phrases, words, etc. These phrases may be used as recorded, or the words contained therein may be interchangeable. The system may account for variations in pronunciation based on the location of each word in the phrase.

Behavioral characteristics, such as the angle at which the user holds the mobile device, the distance from the user's face when taking an image, etc. may also be captured and used for authentication.

The server may also provide time stamping/geostamping to the phrase, such as having the user speak the current date/time, the user's location, an answer to a prompt provided by the mobile device, etc. The GPS location and server date/time may also be appended to the authorization request. This may not only be useful in the authorization process, but may also be useful in reducing fraudulent false claims.

Several biometrics may be combined into a single composite or integrated biometric. For example, a user may register several full biometrics (e.g., voice, finger print, signature, etc.) that may be combined into an integrated biometric, or the user may register an integrated biometric that is generated at the mobile device.

In another embodiment, an integrated biometric may not include a full biometric, but rather portions of several biometrics. When the user provides the biometric samples, only an integrate biometric may be transmitted for authentication. This may be used if limited bandwidth is available, or if the transmission of a full biometric is prohibited.

In certain environments, such as noisy environments, it may be difficult to accurately capture a voice sample for authentication. Alternatively, a user may not wish to provide a voice entry in public, or additional verification for a specific transaction, etc. Thus, other authentication methods, such as tracing a pattern over, for example, the image (live or static) of a user's face, highlighted portions of the user's face, using gestures such as blinking, touching lips, eyes, ears, etc. may be used. The user may also be presented with a signature space, the location and orientation of which may vary to prevent machine-generated signatures. The speed, pressure, etc. applied during the signature process may be captured as well to assist in authentication.

A user's profile may also identify delegates who may be able to authenticate the user if the user is unable to authenticate him or herself (e.g., the user has laryngitis or other ailment) or a biometrics match falls below a predetermined threshold. The delegate may also be required to be a registered user, and may have to authenticate him or herself before authenticating the user.

Referring to FIG. 1, a block diagram of a system for high fidelity multi-modal out-of-band biometric authentication according to one embodiment is provided. System 100 includes workstation 110, which may be any suitable computer, including for example, desktop computers, laptop computers, notebook computers, etc.

System 100 may further include mobile electronic device 120. In one embodiment, mobile electronic device 120 may be a smartphone (e.g., Apple iPhone, Samsung Galaxy, etc.), a tablet computer (e.g., Apple iPad, Samsung Galaxy, Amazon Kindle, Barnes & Noble Nook Tablet, etc.), Google Glass, Smart E-watch/Bracelet, etc. In one embodiment, mobile electronic device 120 may include at least one camera for capturing a machine readable code (e.g., a bar code, QR code, etc.), a microphone, and a speaker. In one embodiment, mobile device 120 may include a front-facing camera and a rear-facing camera.

In one embodiment, system 100 may include screen 130 that may be part of an access control system for a secure area. Screen 130 may be part of an access control system that may be provided at the exterior of a secure area.

System 100 may include server 150. In one embodiment, server 150 may host an application that may be used to authenticate a user. Although only one server is depicted in FIG. 1, more than one server may be provided. For example, a server for biometric authentication may be provided, a server for facial recognition may be provided, etc.

Database 180 may receive, store and/or maintain user information, account information, biometric information, etc.

Workstation 110, mobile electronic device 120 and screen 130 may communicate with server 150 over any suitable network, including the Internet, a local area network, wide area network, virtual private network, etc. In one embodiment, workstation 110 and mobile electronic device 120 and/or screen 130 may communicate with each other using any suitable communication protocol, including WiFi, Bluetooth, Near Field Communication, etc.

Figure 2:
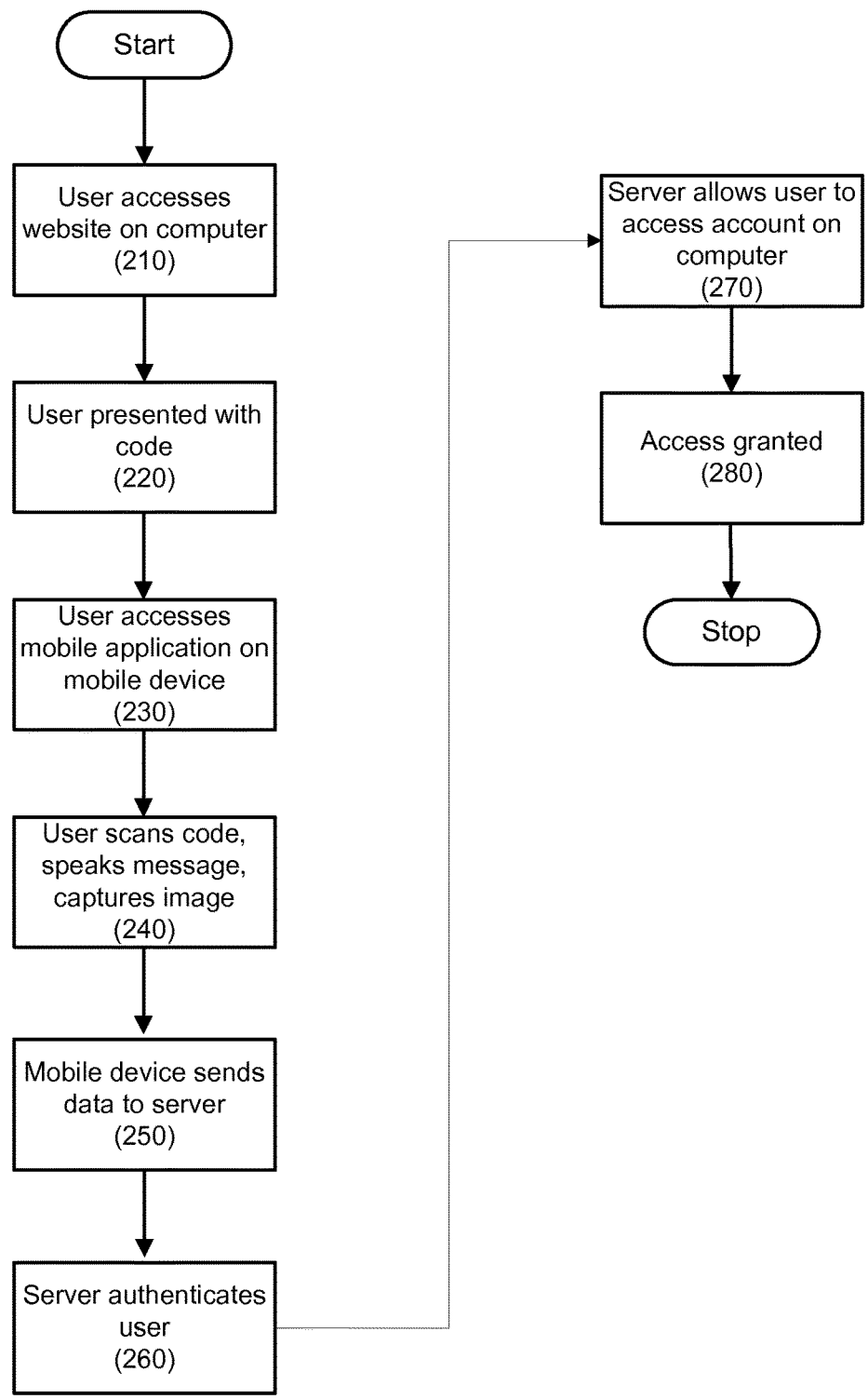
FIG. 2 is a flowchart depicting a method for high fidelity multi-modal out-of-band biometric authentication according to one embodiment.

Referring to FIG. 2, a method for high fidelity multimodal out-of-band biometric authentication according to one embodiment is provided.

In step 210, the user may access a website. In one embodiment, the website may require the user to provide credentials before the user is granted access to the site.

In one embodiment, the user may access the website on a workstation, on a mobile device, on an access panel outside a secure area, etc. For convenience, embodiments will be described in the context of a "workstation," It should be appreciated, however, that this term encompasses desktop computers, notebook computers, laptop computers, access panels, etc.

The website may be any website that maintains an account for the user. For example, the website may be a company website that may require the user to log in. In another embodiment, the website may be for a financial institution with which the user has an account. In another embodiment, the website may be for a medical facility. The website may be used for any suitable business or organization as necessary and/or required.

In another embodiment, the website may be part of an organization's intranet or local area network.

In still another embodiment, the user may launch an authentication computer program or application, such as a mobile application on a mobile device.

For simplicity, the terms "computer program" and "mobile application" will be used interchangeably.

In step 220, the workstation may present the user with a code on the website. In one embodiment, the code may include a unique identifier that may link a browser session, access session, etc. to the user.

In one embodiment, the code may be a machine-readable code, such as a QR code, a bar code, an image, characters, etc. Any suitable code may be used as necessary and/or desired.

In one embodiment, the code may be provided on other devices that have access to the network, including other mobile devices, computers, tablets, televisions, monitors, etc. In one embodiment, the device that provides the code may be a "trusted" device (e.g., a registered device).

In one embodiment, the code may be provided as a RFID code, an audible code, an infrared code, etc.

In one embodiment, the code may be provided instead of a "traditional" log-in screen (e.g., enter a user name and password). In another embodiment, the code may be provided in addition to the traditional log-in information.

In another embodiment, the user may be presented with the code under certain circumstances. For example, the user may periodically be required to authenticate using the code. This may be done weekly, monthly, bi-weekly, whenever the user changes passwords, etc.

In another embodiment, the user may be required to provide authentication when he or she attempts to conduct a transaction with a risk level or value level above a predetermined threshold. For example, if the user attempts to transfer $5,000 from his or her account, the user may be required to provide additional authentication. As another example, if the user attempts to access an area of the website that requires additional security, the user may be required to provide additional authentication.

In one embodiment, the workstation may also provide data to the server. For example, the workstation may provide the session ID, user ID, and a biometrics to the server.

In step 230, if the user has not already accessed a computer program or mobile application, the user may access a mobile application on a mobile device. In one embodiment, the mobile application may provide an interface to receive the code and, for example, receive at least one image of the user and receive a biometric from the user.

In one embodiment, the user may be required to register the mobile device with the server before the mobile application may be used. In another embodiment, the mobile application may be accessed when the code is received. In still another embodiment, the mobile application may be a mobile website accessed on the mobile device.

In another embodiment, the server may push an invitation by, for example, email, text, etc. to a registered mobile device. The invitation may include a link for the user to access an on-line authentication website, a link to download a mobile application, etc.

In step 240, the user may provide the required data to the mobile device. In one embodiment, the user may first input the code, and then will have a predetermined amount of time to provide at least one additional data entry. For example, the user may have 5 seconds to take at least one image of the user's face, and to speak a letter, word, phrase, number, etc. for the mobile device to record.

In one embodiment, three data inputs may be required. The first data input may be the code, the second input may be an image of at least a portion of the user, and the third input may be a biometric of the user.

In one embodiment, the three inputs may be received using three different input devices on the mobile device. For example, the user may use the front-facing camera to scan the code, the rear-facing camera to take at least one image of the user while the microphone receives the voice data from the user. In another embodiment, a touch screen on the mobile device may be used to receive a touch-based biometric (e.g., a fingerprint) from the user. In still another embodiment, gyroscopes and other devices on the mobile device may be used to detect an angle of the mobile device when taking an image of the user, etc.

In one embodiment, after receiving the code, the mobile device may decode the code to access the unique identifier or other information that may be encoded in the code.

In one embodiment, if a voice biometric is captured, the mobile device may display the letters, numbers, words, phrases, etc. that the user is to speak. In one embodiment, an image may be provided, and the user may be prompted to speak the name of the object (e.g., a dog is displayed and the user says "dog.").

In one embodiment, the user may be requested to provide a variable response as part of the voice response, where "variable" means a response that differs from what has been trained or recorded. For example, the user may register certain words or phrases with the server. During authentication, however, the user may be asked to repeat words or phrases that differ from those that were registered. The server may analyze the entered voice and determine if the spoken voice matches the registered voice and expected/predicted behavior.

In one embodiment, the user may be prompted to speak a "secret" phrase or password/passcode. In one embodiment, the user may be requested to use the secret phrase in a sentence. For example, if the user's passcode is "fat cat," the user may say "I just saw a fat cat walk down the street." In another embodiment, the user may be prompted to give verbal commands (e.g., "I'd like to log in to my account") to the systems as a part of the voice authentication. This information may then be used to cross check if the actions are consistent with verbal commands. In addition such natural language provides improved user experience.

In one embodiment, multiple, interchangeable words, numbers, phrases, etc. may be provided. In another embodiment, multiple passphrases may be extracted using training data set and may be rotated. For example, five different passphrases may be rotated, and two custom passphrases may be created based on trained data. The word "voice" is in the trained set used in combination with others for other custom phrases. In one embodiment, a combination and/or fusion of the previously described modalities may be used to match the speed/user experience characteristics, security levels, environmental conditions through machine learning techniques.

In another embodiment, for words that are not trained, the system may apply predictive-based techniques. Thus, if the user says "My voice is my password" instead of "My voice is my passphrase," the system can determine whether the word "password" meets the user's speech characteristics.

In still another embodiment, additional information to be provided or may be selected by the server. For example, the server may request a time stamp (e.g., date/time), a geo-stamp (e.g., the mobile device's location), a corporate/function stamp, an answer to server prompted question, etc. For example, the user may be requested to state the date, user's location, name of the user's employer, temperature, weather, stock quote, etc. The required additional information may be selected randomly, thereby decreasing the likelihood of an imposter being able to successfully use a recording.

In one embodiment, if the user does not complete the entry within a predetermined time, the entry process may stop. In one embodiment, the user may be given a limited number of attempts (e.g., 2 attempts) to enter data before a new code is required, an alternate logon is provided, etc. In another embodiment, after a predetermined number of unsuccessful logon attempts, the account may be locked or access may be otherwise restricted.

In step 250, the mobile device may provide the data to the server for verification. In one embodiment, each input (e.g., code, images, voice sample, etc.) may be provided to the server separately. In another embodiment, two or more of the inputs may be combined as to form an integrated sample.

Additional data may also be captured and provided to the server. For example, behavioral biometrics, such as the position (e.g., angle, distance from the face, etc.) that the user holds the mobile device may be determined. In another embodiment, characteristics of the user's speech (e.g., number of words/minute, intonation, etc.) may be determined. The GPS location of the mobile device may be provided. The time that the user took to enter all data may also be provided. In one embodiment, this data may be compared against previously-collected data to identify anomalies, outliers, etc., that may indicate fraud. In one embodiment, this data may be stored and future accesses may be compared against this data.

In step 260, the server may review the received data and authenticate the user, or decline access to the user. In one embodiment, any biometrics authentication may be performed by a biometrics server.

In one embodiment, the server may check with organization policies to make sure that use of biometric authentication is approved for granting access, authorizing a transaction, that the user is authorized based on the user's role to authorize the transaction, etc.

In one embodiment, the code may be verified. In one embodiment, this may include verifying the data in the code, checking the time that it took from the code being provided to the user to the completion of the data entry, etc. In one embodiment, session data from the code may be validated and/or verified.

In one embodiment, the voice data may be reviewed to see if it is consistent with stored voice data. Examples of suitable commercially-available voice authentication software include VoiceVault Fusion by VoiceVault, VoiceVerified by CSID, VocalPassword™ and FreeSpeech™ from Nuance.

In one embodiment, variations in the voice sample may be considered based on the location of a word, number, letter, etc. in a phase that is spoken. For example, a user may speak a word differently depending on where the word is located in a phrase (e.g., beginning versus end), the words that is spoken before/after, etc. Thus, if the word is not in the same spot as in the registration sample, some variation may be expected.

In step 270, if the user is authenticated, the server may allow the user to access the account, webpage, secure area, authorize the transaction, etc. In one embodiment, the server may allow the user to bypass the traditional user name and password log-in. In another embodiment, the user may still provide the traditional login information.

In one embodiment, the data received may be stored in a database if it was successful, if it was unsuccessful, or both. Successful data may be used to refine the voice biometric data, face recognition data, etc. for future access. It may also be used to identify repeated attempts to access an account, and may be provided to the authorities as necessary.

In step 280, access may be granted to the workstation, mobile device, etc. In one embodiment, an application on the workstation, mobile device, etc. may periodically poll the server for authorization.

Modifications may be made in situations where the entry of a voice biometric may not be appropriate, may be undesirable, or may not be possible. For example, a user may be in a noisy environment, in a meeting, etc. or may not feel comfortable speaking his or her passphrase out loud. Thus, image/video-based authentication, such as facial recognition, may be used.

In another embodiment, modifications may be made when additional authentication is required for certain transactions.

For example, in one embodiment, the user may make at least one gesture during the image capture. For example, the user may touch or move his or her eyes, ears, nose, lips, or any other location that has been preselected by the user. In another embodiment, the user may be instructed to touch a certain point of his or her face by the mobile device. In another embodiment, the user may blink, wink a predetermined number of times, in a predetermined pattern, etc., make facial gestures (e.g., smile, frown, etc.). This real-time instruction may be used to reduce the possibility of an imposter capturing an image of a picture of the user.

In another embodiment, the user may touch or indicate at least one element or area on the captured image. For example, after image capture, the image may be displayed to the user with regions on the face being highlighted or otherwise indicated. The regions may be color coded by the face recognition algorithm. The user may select at least one region, trace a trail among several regions, etc.

In another embodiment, markers (e.g., dots or a similar indicator) may be provided on the image of the user, and the user may be requested to trace a registered pattern among the markers. In one embodiment, the user may be requested to trace a pattern over a live image/video of himself or herself in real-time.

In another embodiment, the user may sign his or her name on the screen while the front-facing camera captures an image or video of the user signing. In another embodiment, the user may sign a space that may be randomly located on an image of the user's face.

In still another embodiment, behavioral profiles may be considered. For example, a detailed profile of user behavior including markers such as the distance from the mobile device to the user's face, the direction/angle of the mobile device, background images, light/noise levels, etc. may be considered. In one embodiment, if the anomaly exists (e.g., the mobile device is much further from the face than any other prior validation, etc.) the authentication attempt may be denied.

In another embodiment, a physical gesture password may be used. For example, after an image is captured, the user may be presented with the image of the face with markers superimposed thereon. In one embodiment, the markers may be based on characteristics of the user's face (e.g., structure, location of features, etc.). In one embodiment the user may selectively zoom in/out of regions using, for example, touch-screen features to create alternative images/distortions of the image that may be sent to the server for authentication.

In one embodiment, the markers may be specifically created by the face recognition algorithm. As such, the markers are biometrically significant/specific to the user. The position of the markers may change based on the captured image of the user on the device screen, which is affected by the distance between the device/face, angle/tilt of the face, direction of the camera, etc.

In another embodiment, the markers may be positioned in an array. Any suitable relationship between the markers and the face, including no relationship, may be used as necessary and/or desired.

In another embodiment, the user may touch at least one area of the user's face (e.g., ears, nose, chin, or biometric marker highlighted area, etc.), may blink a certain number of times, may make lip movements, expressions, etc., without blinking, etc.

Figure 3:
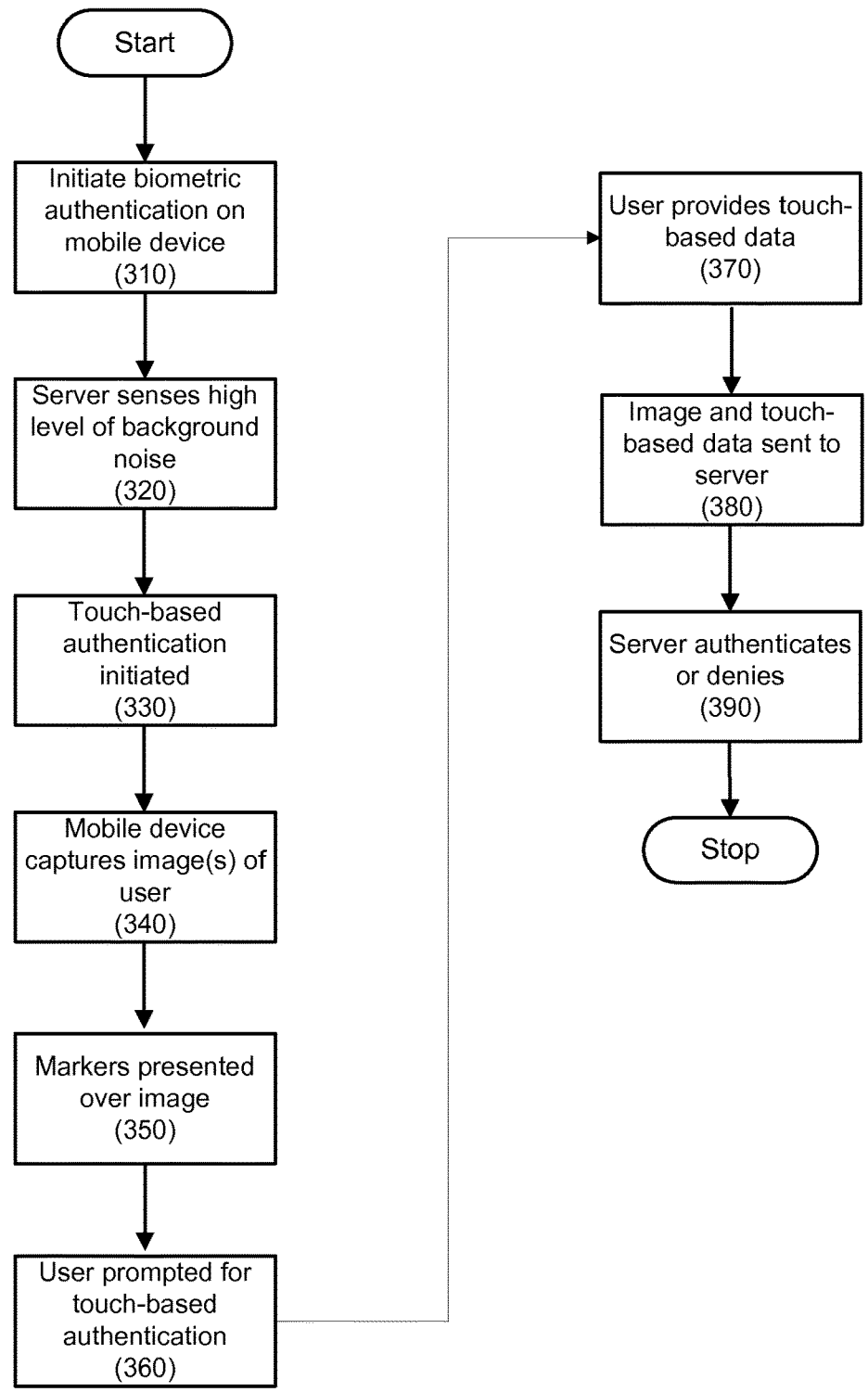
FIG. 3 is a flowchart depicting a method of authentication using touch and face recognition according to one embodiment.
Figure 4:
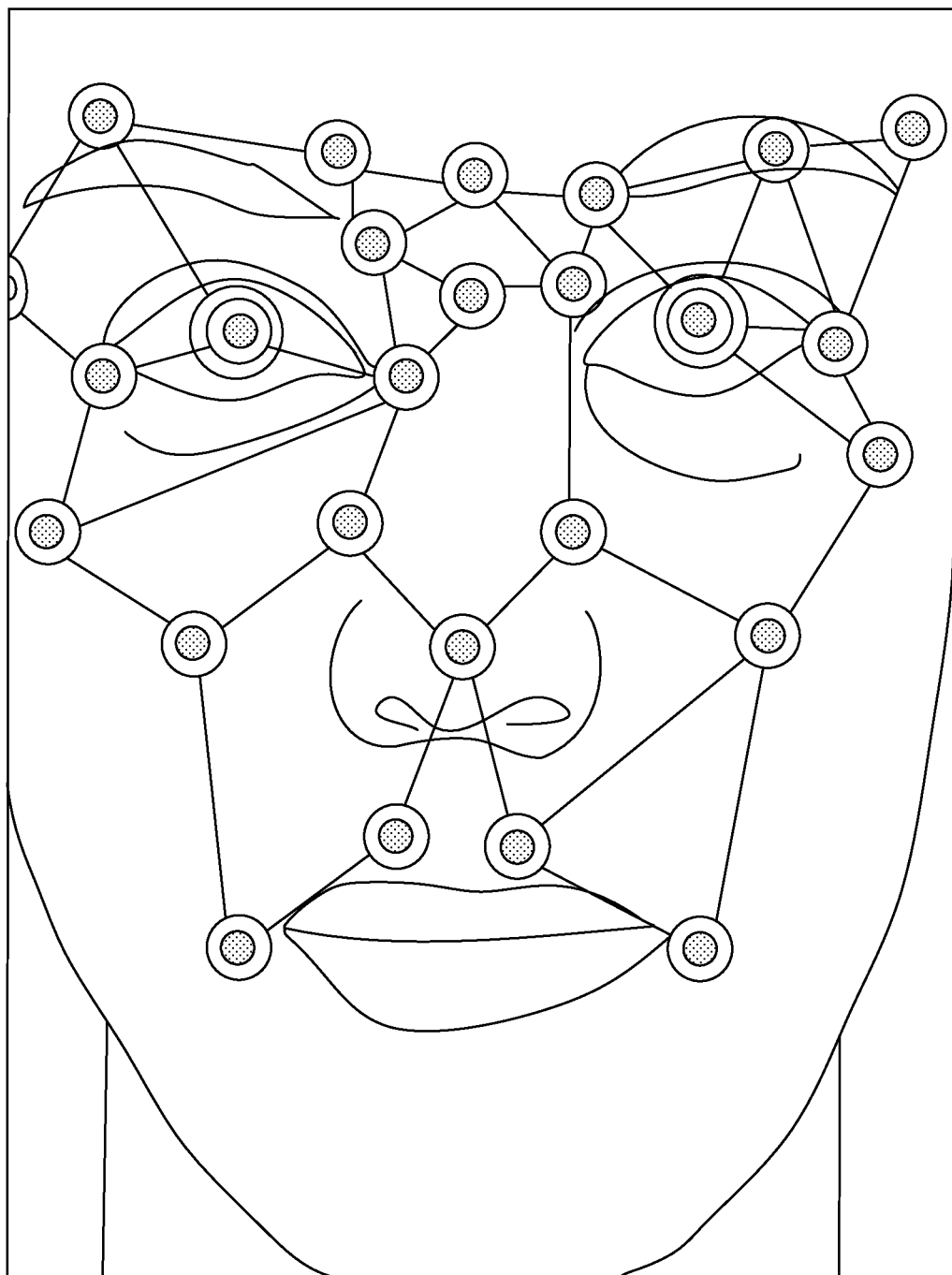
FIG. 4 depicts an example of a facial image with markers according to one embodiment.

Referring to FIG. 3, a method of authentication using touch and face recognition is provided. In step 310, the user may initiate biometric authentication on the user's mobile device.

In step 320, the server may sense a high level of background noise, thereby making voice-based authentication more difficult, undesirable, etc. In another embodiment, the user may determine that he or she does not wish to use voice-based authentication. In still another embodiment, the server may require additional authentication from the user.

In step 330, touch-based authentication may be initiated. In one embodiment, touch-based authentication may involve the user touching a captured image of himself or herself in at least one place, in a pattern, etc. In another embodiment, touch-based authentication may involve the user signing an area on the captured image. In still another embodiment, touch-based authentication may involve the user making a gesture by touching or otherwise indicating at least one area of the user's face during image capture.

In step 340, the mobile device may capture at least one image of the user. In one embodiment, the mobile device may capture a video of the user.

In one embodiment, a detailed profile may be acquired. For example, the device may capture background noise level/profile, lighting profile, GPS location of the mobile device, background image, etc. for anomaly detection.

In one embodiment, if gestures are used, the user may touch/indicate at least one area of the user's face during image capture.

In step 350, the mobile device may present an image of the user on the screen of the mobile device. In one embodiment, markers may be superimposed over the image of the face. In one embodiment, the location of the markers may be based on the features of the user's face. For example, markers may be provided at the corners of the user's eyes, center of the eyes, eye brows, corners of the mouth, nose, cheeks, etc. An example of such markers are provided in FIG. 4.

In another embodiment, the markers may be positioned independent of the facial features, and may present an array (e.g., a 4 by 4 array) or any random structure as necessary and/or desired.

In another embodiment, the user may be presented with an area to enter the user's signature on the image. In one embodiment, the size, location, and/or orientation of the signature area may vary so as to reduce the likelihood of imposters, robo-signatures, etc. In one embodiment, the speed of the signature, the pressure, and other signing characteristics may be captured and considered.

In one embodiment, the signature is required to fit a custom area marked by biometrics markers (i.e., aspect ratio, angle/tilt, size and other aspects of the signature have to be adjusted). This makes the process significantly difficult for imposters with previously captured signature profiles or cases where the imposter mimics signature manually.

In another embodiment, a signature space is not provided for the user on the image. Instead, the user pre-selects the markers that indicate the signature space, and enters his or her signature within that space. Thus, if the user does not know the markers, he or she will be unlikely to enter the signature in the proper area.

In step 360, the user may be prompted to provide the touch-based authentication. In one embodiment, if the user has multiple touch locations and/or patterns, the user may be reminded of the touch/pattern to enter.

In step 370, the user may provide the touch-based entry. For example, the user may touch at least one area of the face, at least one marker, etc. In another embodiment, the user may trace a pattern among the markers, areas, etc. Any suitable entry may be provided as necessary and/or desired.

Figure 5A:
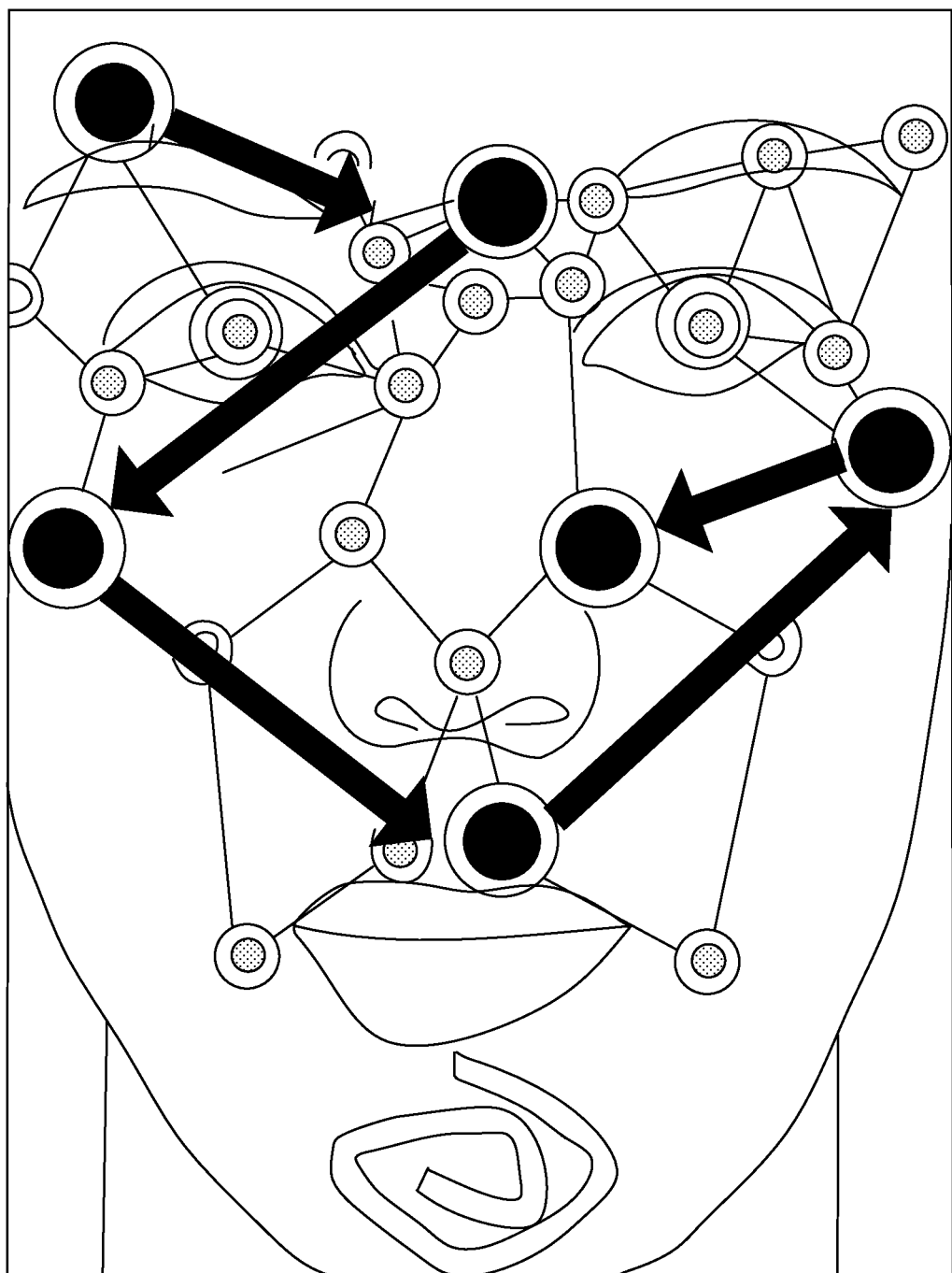
FIGS. 5A and 5B depict examples of tracing on facial images according to embodiments.
Figure 5B:
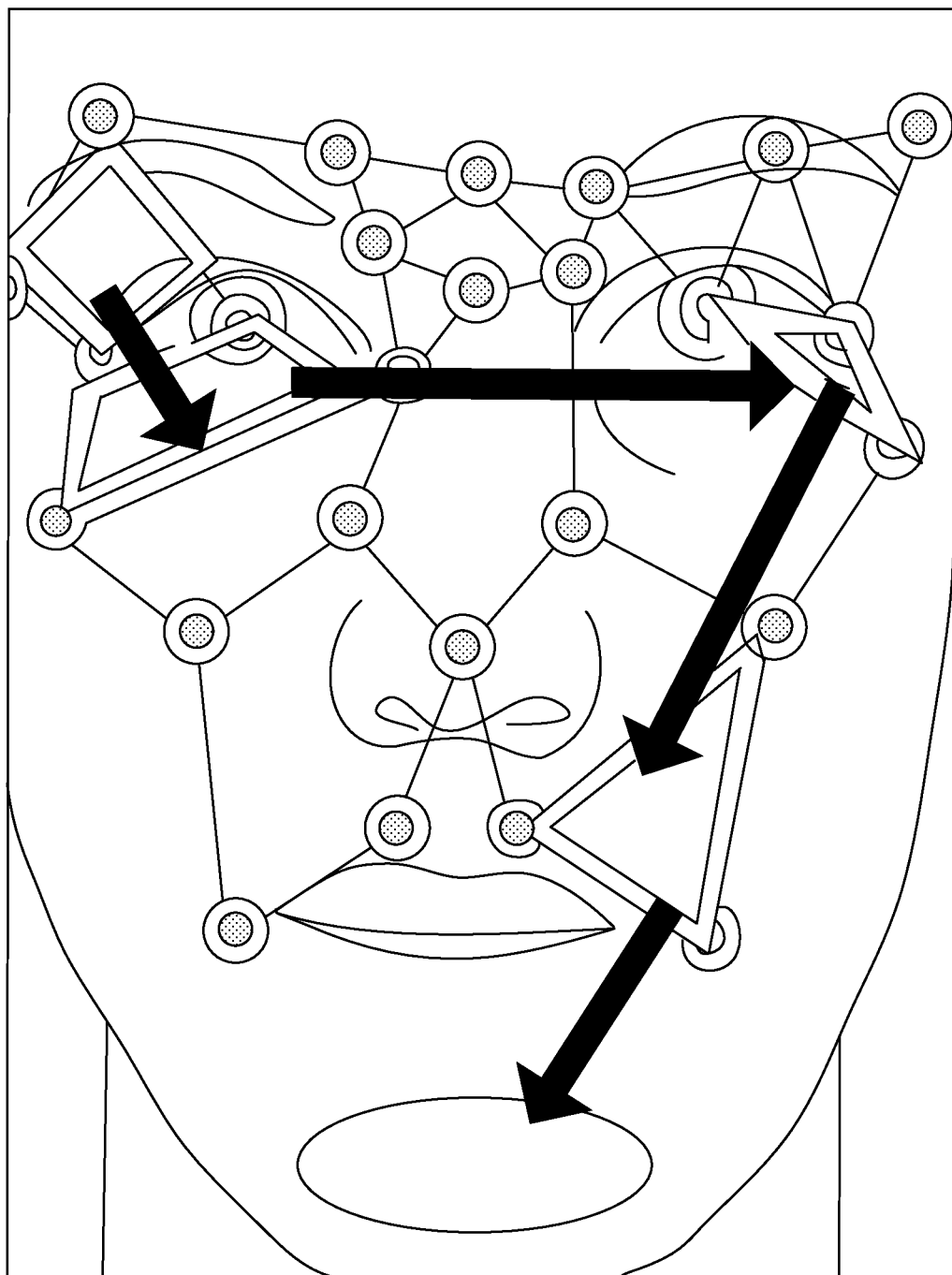

An example of tracing from marker to marker is provided in FIG. 5A, while an example of tracing from different areas is provided in FIG. 5B.

Figure 6:
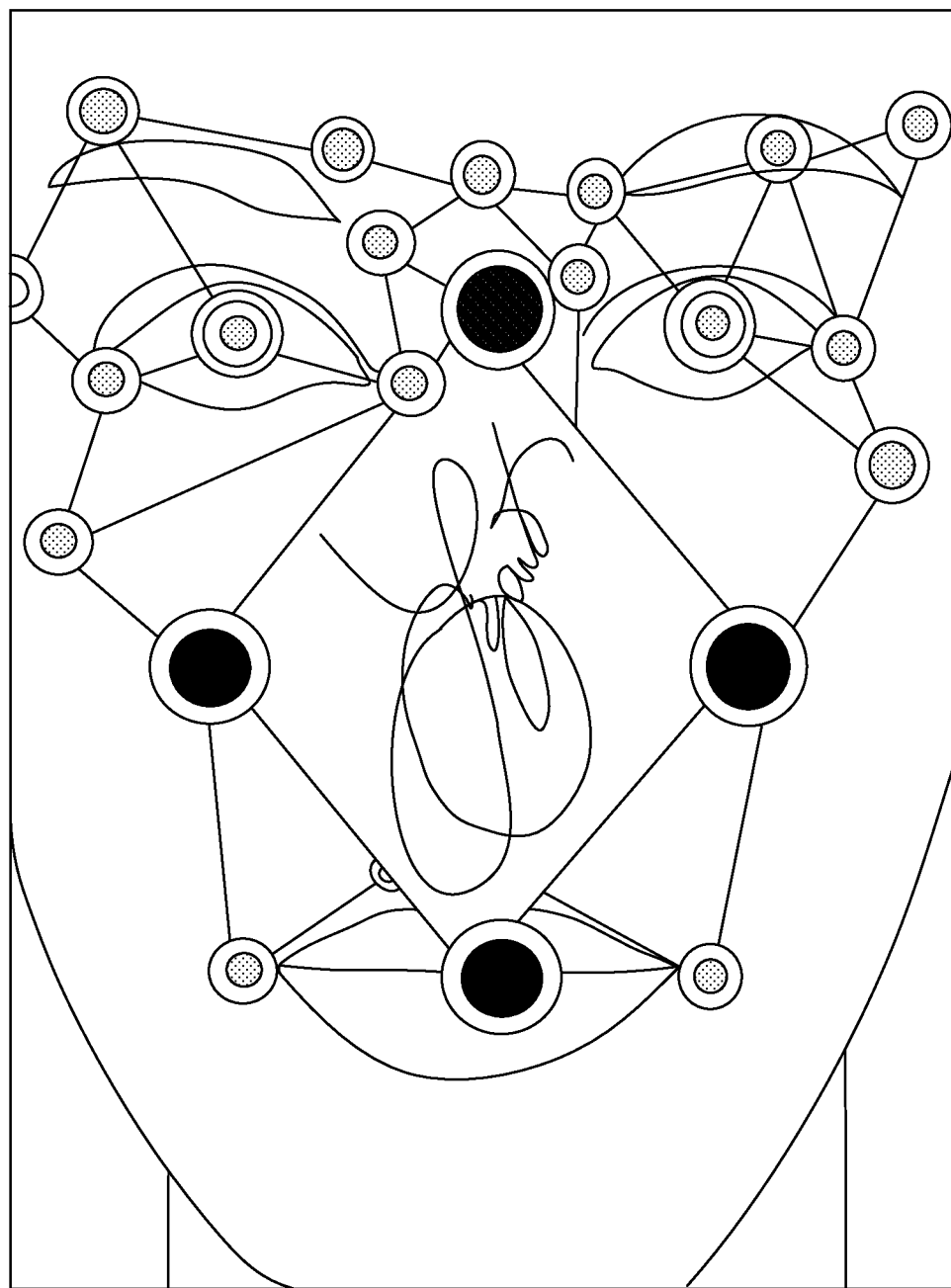
FIG. 6 depicts an example of the entry of a signature on a facial image according to one embodiment.

An example of a user entering a signature is provided in FIG. 6.

In step 380, the image and the touch-based data may be provided to the server, and, in step 390, the server may authenticate or deny the user.

Figure 7:
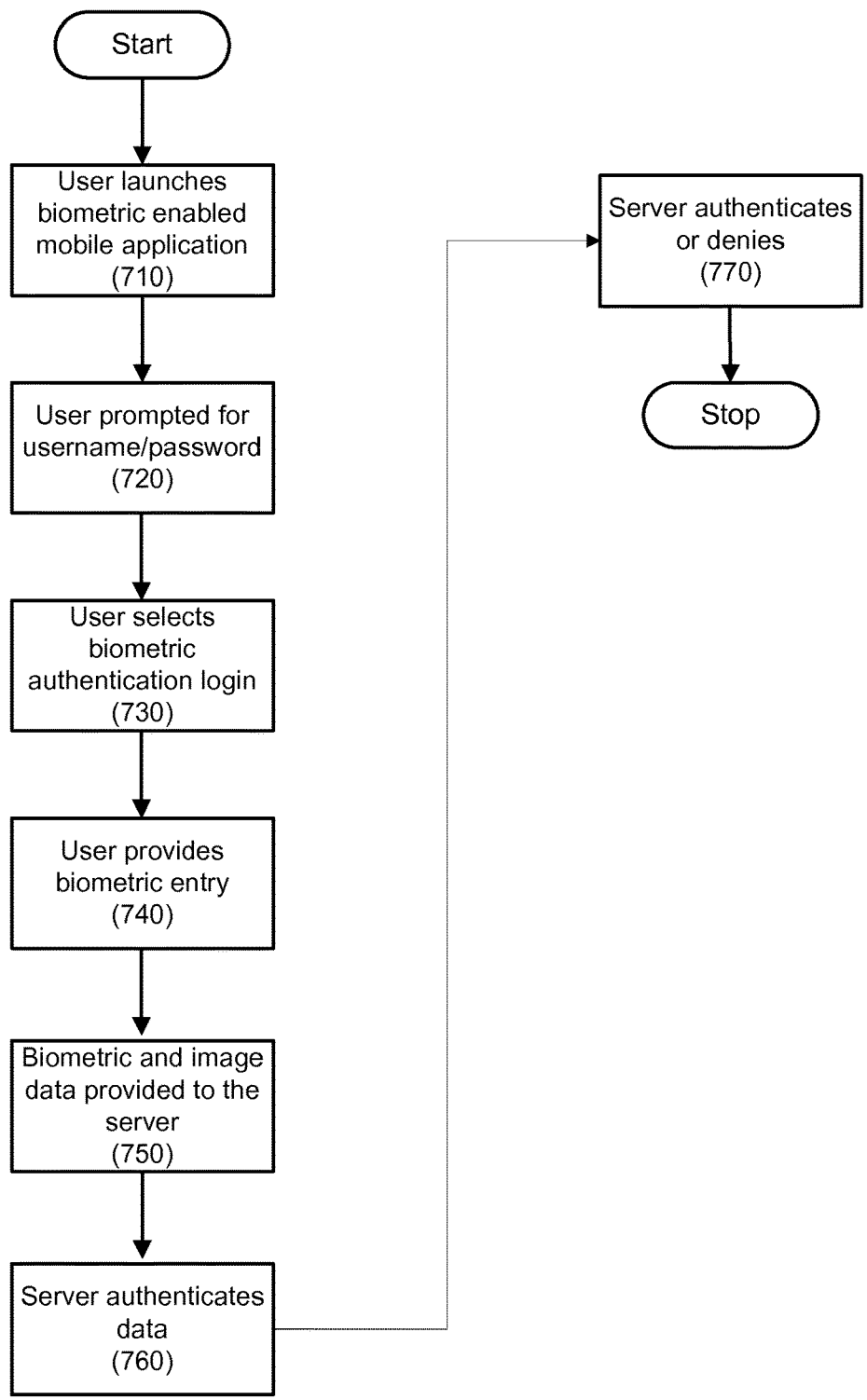
FIG. 7 is a flowchart depicting a method of authenticating a mobile application using biometrics according to one embodiment.

Referring to FIG. 7, a method of authenticating a mobile application using biometrics is provided.

In step 710, the user may launch a biometric-enabled mobile application on a mobile device.

In step 720, the mobile application may prompt the user for traditional login information (e.g., username and password) or for biometric authentication.

In step 730, if the user selects biometric authentication, the mobile device may prompt the user for biometric entry.

In step 740, the user provides at least one biometric entry. In one embodiment, at least one image, video, etc. of at least a portion of the user (e.g., the user's face) may be captured. In another embodiment, a voice biometric may be captured. In still another embodiment, a touch-based biometric may be captured.

Combinations of images and biometrics may be captured as is necessary and/or desired.

In step 750, the mobile device may submit the captured data to the server. For example, in one embodiment, the biometric and image data may be submitted to the server.

In step 760, the server may authenticate the data.

In step 770, if the server authenticates the data, the user is logged in to the mobile application. Otherwise, access is denied.

In another embodiment, biometric authentication may be used on individual transactions. For example, for transactions that are above a pre-specified threshold, biometric authentication may be required. The threshold may be based on a value of the transaction, a risk of a transaction, an anomaly detection algorithm, a likelihood of fraud, etc. In one embodiment, the authentication may be requested by providing a mobile device with a machine readable code (e.g., QR code), near field communication, Bluetooth, etc.

In one embodiment, the use of biometric authentication may reduce the number of false fraud claims, as the biometric authentication is tied to the user (e.g., image, speech, signature, combinations thereof, etc.) may be tied or linked to the user providing authentication.

Figure 8:
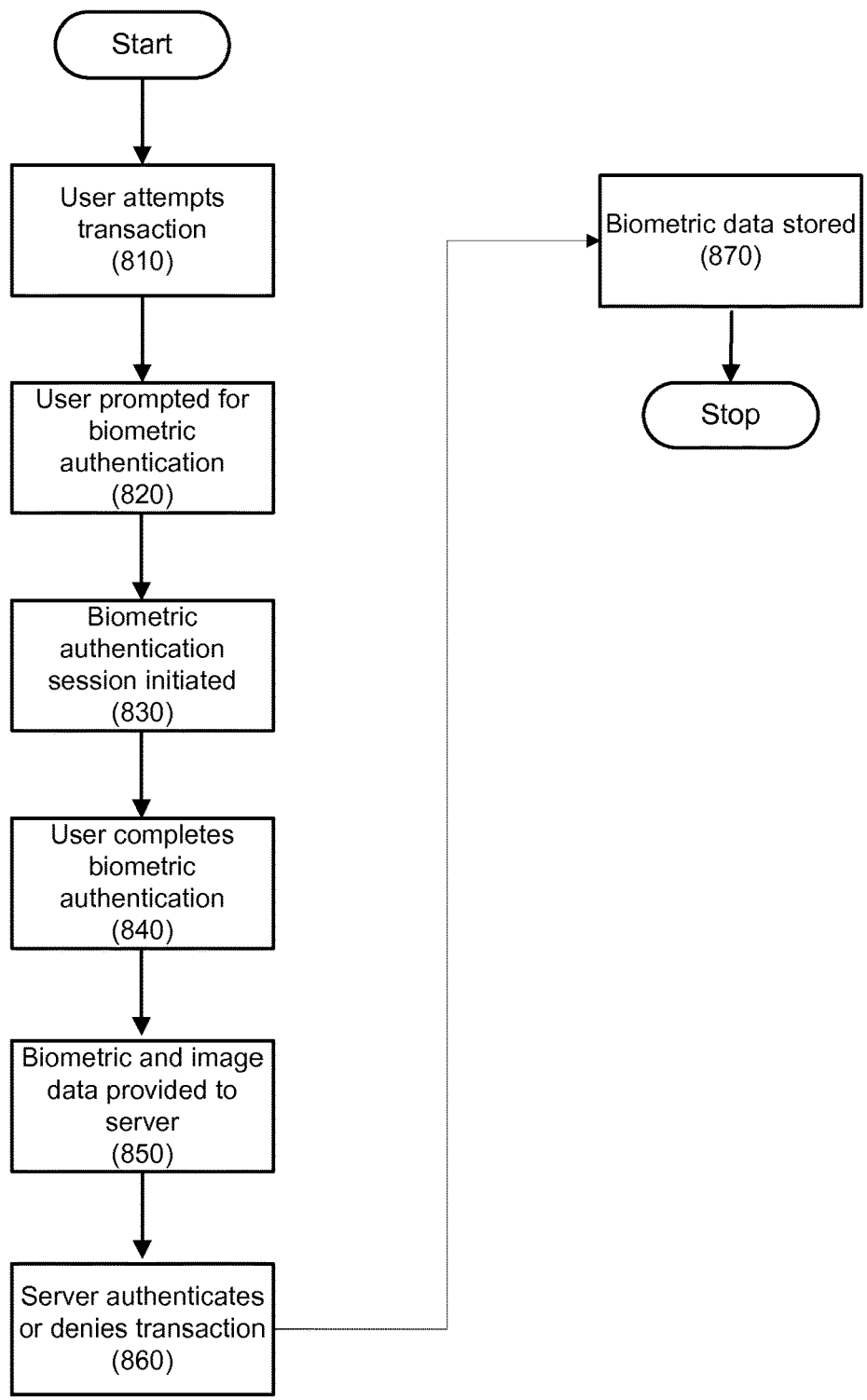
FIG. 8 is a flowchart depicting a method of authenticating a transaction using biometrics according to one embodiment.

Referring to FIG. 8, a method of authenticating a transaction is provided.

In step 810, a user may attempt a transaction that may exceed a predetermined threshold. The threshold may be based on a value of the transaction, a risk of a transaction, an anomaly detection algorithm, a likelihood of fraud, etc.

In step 820, the user is prompted for biometric authentication.

In step 830, a biometric authentication session is initiated on the mobile device.

In step 840, the user completes the biometric authentication. The level of biometric authentication may vary depending on the value of the transaction, amount of risk, etc.

In one embodiment, the biometric authentication session may be tied to the proposed transaction. For example, the user may be required to state "please execute transaction 556439." The user may further be required to provide a voice biometric or other biometric.

In step 850, the biometric and image data may be provided to the server.

In step 860, the server may authenticate or deny authentication, and therefore, the transaction.

In step 870, the biometric data is stored and associated with the transaction. For example, the captured image and signature, pattern, voice, etc. may be stored with the transaction file.

In one embodiment, the system may be retrained to address false rejections (e.g., rejections followed by successful password authentication). For example, after a certain number of false rejections (e.g., 2), the password authentication acquired biometrics may be incorporated with higher weight to retrain the biometrics system.

In one embodiment, the user can manually initiate a retraining session to address changes in behavior/appearance (e.g., glasses that will distort the eye biometrics, wearing contacts, surgery that alters the face biometrics markers, voice/health problems, etc.).

As discussed above, composite biometrics may be used. A composite biometric may be a combination of more than one biometric. In one embodiment, the composite biometric may include biometrics for more than one individual. For example, instead of storing and authenticating based on personal biometrics, composite images/profiles for groups of people (e.g. employees in the same group) with the same level of access may be created. Thus, in one embodiment, only composite biometrics are stored, sent, and received, rather than individual profiles.

In one embodiment, composites may be based on approval chains for transactions, shared geographic location, department, role, etc.

For similarly located persons, the proximity or relative locations of mobile devices in the group may be used.

Once the biometrics data is captured through a mobile device, the authentication process may match the user's captured data to the composites. In one embodiment, only differences from the composites are sent to the server. Thus, the mobile device may not need to store personalized biometrics, making it less susceptible to being compromised.

Figure 9:
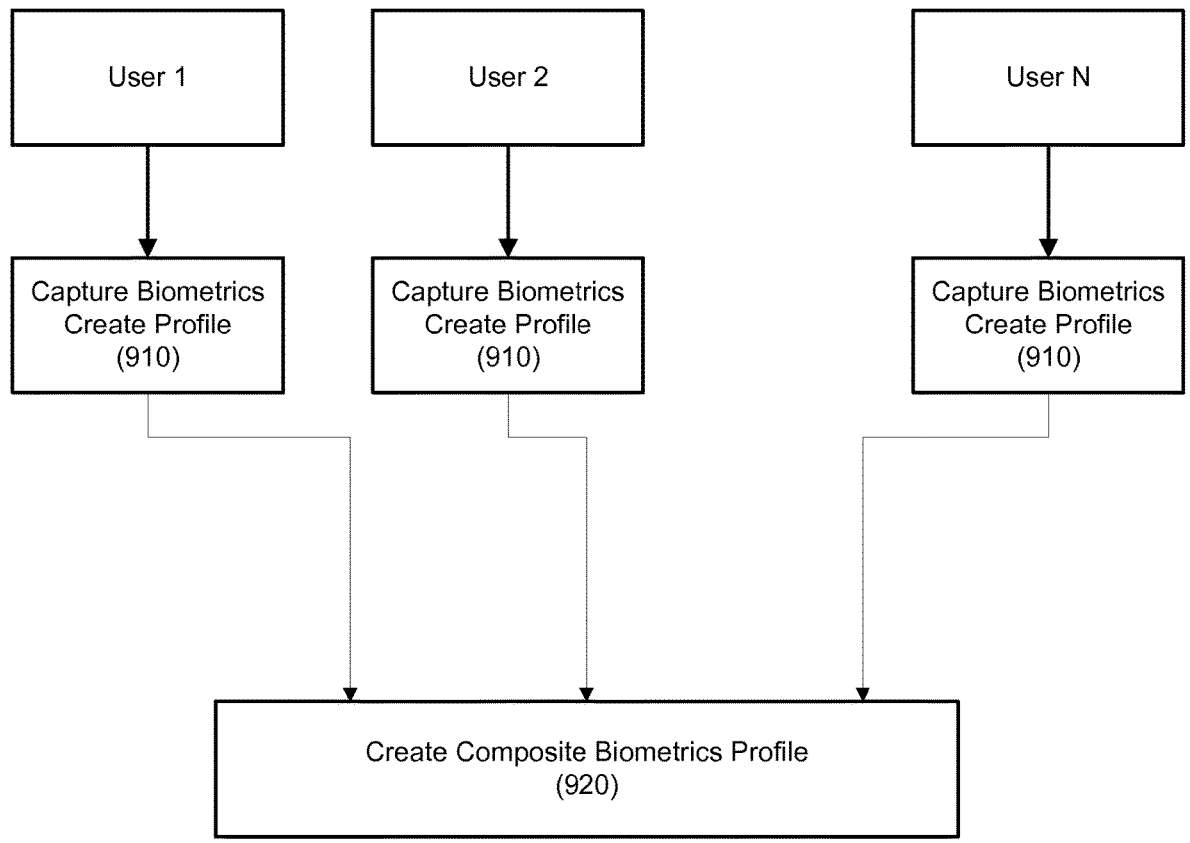
FIG. 9 is a flowchart depicting a composite biometric capture process according to one embodiment.

Referring to FIG. 9, a composite biometric capture process is provided. First, in step 910, the biometrics for User 1-User N are captured, and an individual profile is created. Next, in step 920, a composite biometrics profile for any group of User 1-User N is created.

Figure 10:
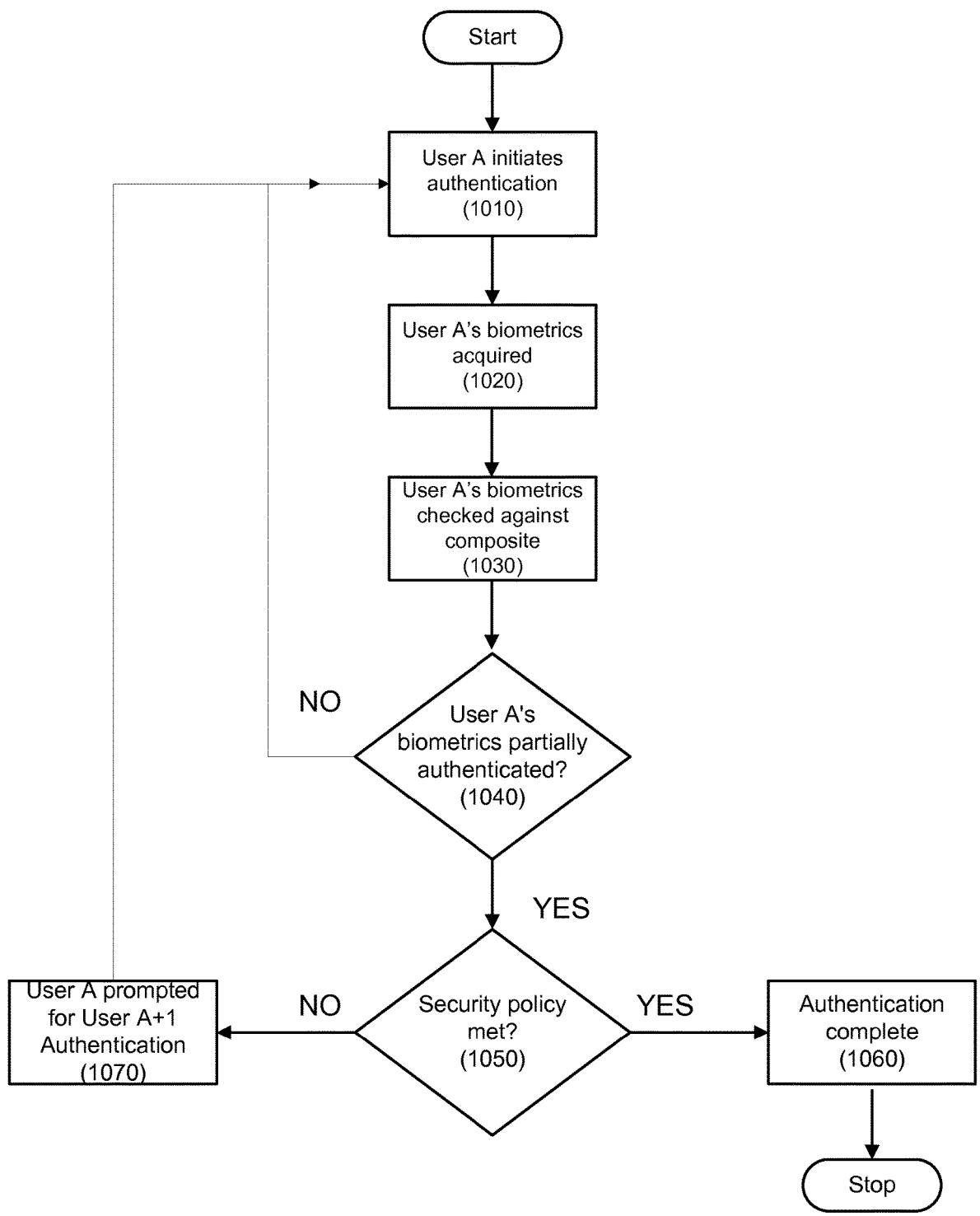
FIG. 10 is a flowchart depicting an authentication process for multi-user composite biometrics according to one embodiment.

Referring to FIG. 10, an authentication process for multi-user composite biometrics according to one embodiment is provided. In step 1010, User A initiates biometric authentication. In one embodiment, User A may be attempting to authenticate a transaction.

In step 1020, User A's biometrics may be acquired. In one embodiment, User A's biometric may be acquired using a mobile device as discussed herein.

In step 1030, User A's biometrics may be compared against a composite profile for a group. In one embodiment, individual biometrics may be checked against the composite biometrics vector through calculating delta function and match rates. User biometrics may be weighed based on, for example, the user's specific job role, transaction details, risk factors, environmental conditions and the quality of biometrics/confidence for the individual user.

In step 1040, if the User A's biometrics are not partially authenticated, the process may continue to recapture User A's biometrics.

If User A's biometrics are partially captured, the security policy may be checked. For example, a check may be made to ensure that User A has authority to authorize the transaction. In another embodiment, a check may be made to see if multiple users need to authorize the transaction. If, in step 1050, the security policy is met, then in step 1060, authorization is complete.

If the security policy is not met, in step 1070, User A is prompted for User A+1 to provide biometric authentication. This may involve getting someone higher on the chain to authorize the transaction, another person of the same level, etc.

In one embodiment, "interactive biometrics" may be used. In one embodiment, an integrated biometrics process may not focus on capturing or matching based on individual modalities of biometrics such as purely face recognition or voice recognition. Instead, it creates an integrated profile where key markers may be tied to each other to create integrated markers in a multi-dimensional spatio-temporal vector space.

Figure 11:
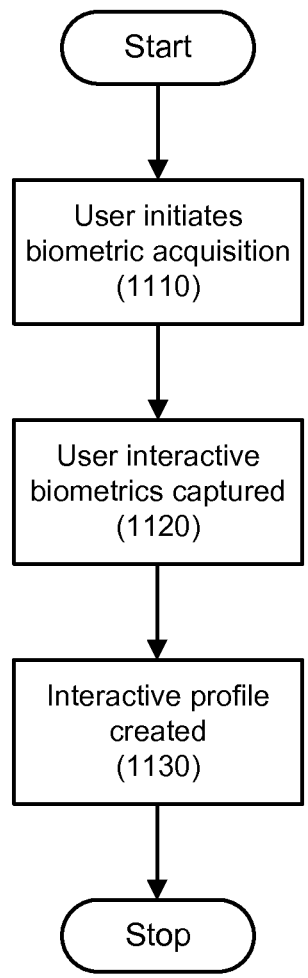
FIG. 11 is a flowchart depicting an interactive biometric capture process according to one embodiment.

Referring to FIG. 11, an interactive biometric capture process is disclosed. In step 1110, the user may initiate biometric acquisition.

In step 1120, the user's interactive biometrics may be captured. In one embodiment, the interactive process may be a fused capture where a free form interactive activity is translated to multiple fused biometrics profiles on the server end. A fused process may integrate and/or link multiple modalities and individual features for a user.

In one embodiment, biometrics markers may be spatio-temporally linked with respect to other markers and environmental parameters. Examples include (1) the user's facial biometrics markers while saying a selection of specific keywords; (2) the user's facial biometrics markers for facial expressions/gestures in response to the interactive process; (3) behavioral profile during face recognition (e.g., blinks), behavioral gestures during interactive process; (4) the distance between user's face to mobile device to read a set of words from the screen; (5) the user's impulse response characteristics linked to, for example, pupil sizing, face biometrics, etc. when presented with familiar images or images that create behavioral response such as facial gestures; and (6) an image profile that may be linked to an infrared profile during interactive speech.

In one embodiment, the integrated biometrics process may identify key marker links among image/voice/behavioral, etc. data to create new features for authentication. For example, markers <1-N> in image, <x-y> in voice, <p-q> in behavioral profile may create a specific spatio-temporal pattern/feature during the interactive process that uniquely identifies the user across multiple biometrics planes.

In one embodiment, the process may execute with the user's attention. In another embodiment, the process may run in the background while the user performs other tasks.

The interactive process may capture biometrics, including for example, face biometrics, iris biometrics, voice biometrics, behavioral biometrics (through video recording), keyboard/touch screen usage, other forms of biometrics/behavioral profiles, etc.

In step 1130, a profile for the user is created. The resulting integrated profile may have partial biometrics for individual modalities, such a N features out of total M features for face recognition. Individual features in face recognition, however, may be linked to other modalities, such as voice/video based behavioral profiling, to environmental factors, etc.

Figure 12:
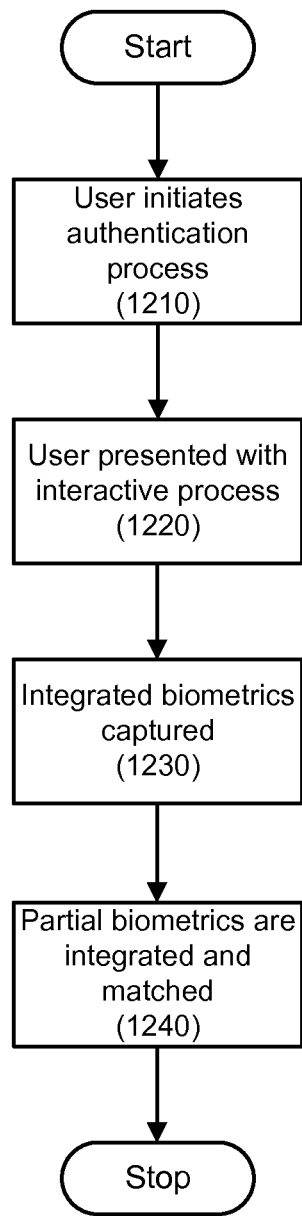
FIG. 12 is a flowchart depicting an authentication process involving integrated biometrics according to one embodiment.

In FIG. 12, an authentication process involving integrated biometrics according to one embodiment is provided.

In step 1210, the user may initiate an integrated biometrics authentication process. This may be done, for example, by using a mobile application executed on a mobile device.

In step 1220, the user is presented with an interactive process.

In step 1230, multiple biometrics and/or data are captured in an integrated process. In one embodiment, this process may capture a plurality of face biometrics, iris biometrics, voice biometrics, behavioral biometrics, keyboard/touch screen usage, and other biometrics/data as necessary and/or desired.

In one embodiment, as part of the acquisition, biometric features and data may be linked and analyzed with respect to each other and/or environmental factors, etc.

In step 1240, partial biometric features may be integrated and matched using, for example, corresponding matching scores. In one embodiment, the user may not be verified or authenticated in any individual modality, but rather though an integrated linked modality. This may provide higher levels of security against spoofing, imposters, etc.

In one embodiment, additional security features may be used. For example, multiple biometrics may be captured and/or recognized simultaneously. In one embodiment, a user's iris and face (and other modalities) may be recognized simultaneously. This may be accomplished using a mobile device's camera, for example. In another embodiment, Google Glass, or a similar device, may be used for iris recognition using a high-resolution image of one eye.

In another embodiment, simultaneous face recognition and finger printing may be used. For example, thin film technology may be used to allow finger print authentication using the mobile device touch screen. This enables simultaneous face recognition and finger printing, where the fingerprint and face biometrics are captured by user simply holding the mobile device.

In one embodiment, customizable fused partial modes may be based on a user's geographical location and available biometrics data. For example, partial face recognition (using eye area) with voice recognition may be used. This may be useful in areas where the use of full biometrics is not permitted.

In one embodiment, the use of full, partial, composite, etc. biometrics may be based on user preferences. In one embodiment, the user preferences may be set by the user, based on the user's calendar, based on the GPS location of the mobile device, etc.

In one embodiment, machine learning based techniques may be used to determine the modalities, thresholds, algorithms, etc. that are best fitted to be used in that specific session based on a multi-dimensional vector including user preferences, security settings, environmental factors, transaction characteristics, etc.

Figure 13:
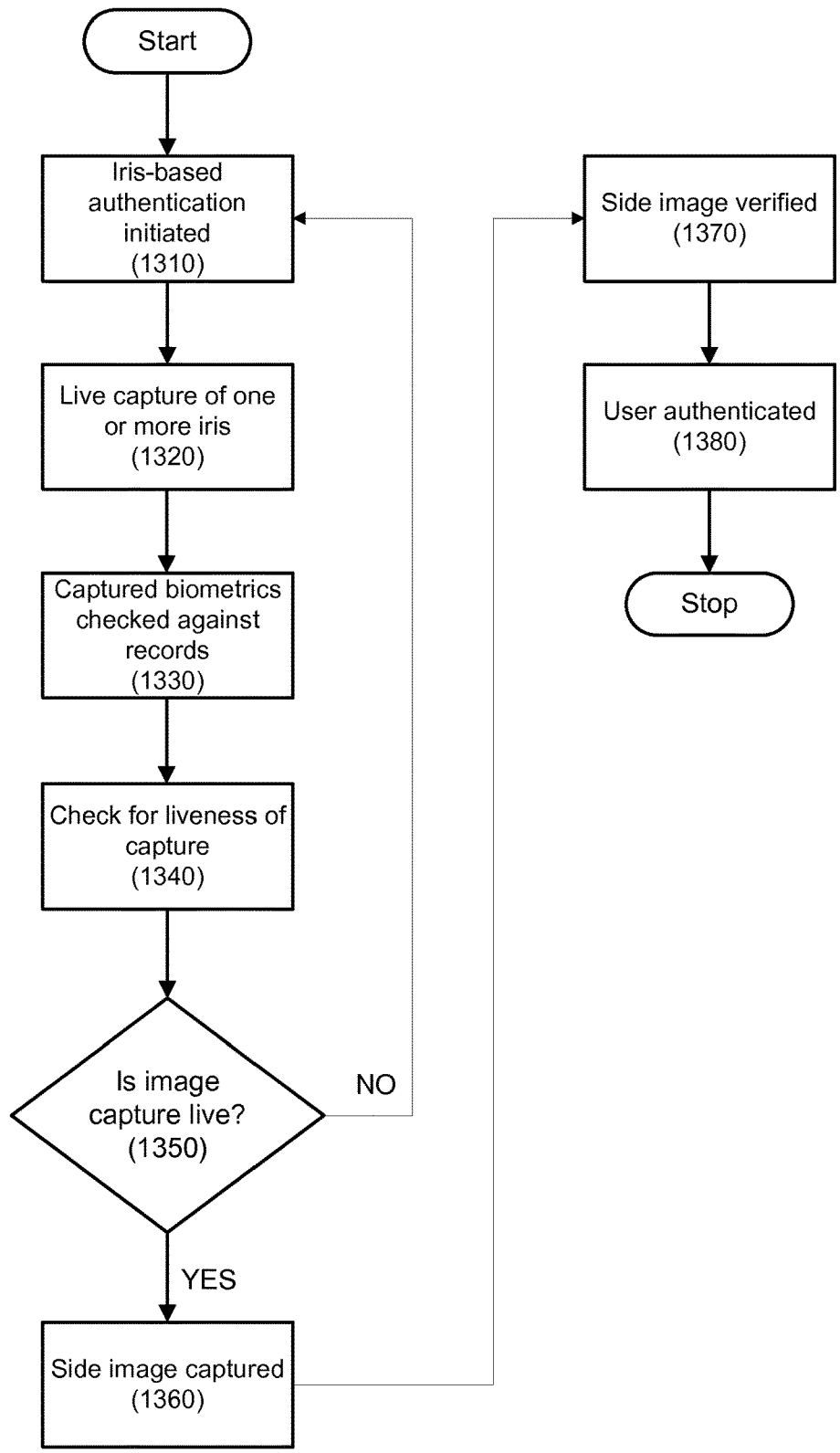
FIG. 13 is a flowchart depicting an exemplary iris capture method according to one embodiment.

Referring to FIG. 13, a flowchart depicting an iris recognition technique according to one embodiment is disclosed. In one embodiment, iris recognition may be a part of any of the authentication processes disclosed herein. In another embodiment, iris authentication may be a stand-alone process.

In step 1310, an iris-based authentication process is initiated. In one embodiment, iris authentication may be a stand-alone authentication procedure. In another embodiment, iris authentication may be part of a larger authentication process.

In step 1320, an image, video, etc. of one or both of the user's irises may be captured. In one embodiment, the iris capture may be performed by the user's mobile electronic device. In another embodiment, the iris capture may be performed by a camera provided for a desktop or notebook computer. In still another embodiment, the iris capture may be performed using any suitable camera, such as a security camera.

In one embodiment, the image or video may be captured sequentially (i.e., one after the other). In another embodiment, the image or video capture may be performed in parallel (i.e., both irises at the same time).

In step 1330, the captured image may be compared to iris information in a database. In one embodiment, this comparison may be performed by the mobile device sending some, or all, of the image data to a server. In another embodiment, this comparison may be made at the mobile device.

In one embodiment, anomaly detection may be performed on the captured image/video. In one embodiment, this may involve checking the size of the irises with eye-region biometrics from the user's profile, prior authentications, etc. Other anomaly detections may be performed as necessary and/or desired.

In step 1340, the mobile device and/or server may determine if the captured image, video, etc. is a live image, video, etc. In one embodiment, this may be performed by instructing the user, via the user's mobile device or suitable interface, to look up, look down, cross eyes, etc. In one embodiment, the user may have a limited time (e.g., 2 seconds) to respond as directed.

In another embodiment, different lighting may be used to check for a live image. For example, multiple images and/or video may be used to detect the change in pupil size in response to different lighting. In general, the size of the change in pupil size is proportional to the level of lighting change. Thus, in one embodiment, the lighting level and the pupil size may be determined for different lighting levels.

In one embodiment, the user's mobile device may use its flash, change the brightness of its screen, etc. to cause a change in lighting level.

In one embodiment, a check may be made to see if the image of the compressed or decompressed iris is consistent with the user profile, a stored image, etc. For example, the compressed or decompressed iris image may be a systematically distorted version of the original image, where different features are distorted with different scaling factors based on their location. The distortion may be calculated based on an elastic band model, can be matched against a profile, etc. For matching, the user can be profiled with different lighting conditions such that the system acquires a number of dilation factors (e.g. 25%, 50%, 75%, 100%).

In one embodiment, the images/video may be checked to determine if the user is wearing colored contact lenses. In one embodiment, a check may be made for a detectable pattern in the inner circle of the iris. In another embodiment, a check may be made for pattern changes with different lighting. In another embodiment, a check may be made for outer periphery effects of color contacts, whether there are detectable ring shadows around the iris, etc. In still another embodiment, a blinking test may be performed to determine if the iris is moving relative to the rest of the patterns during/after blinking. Other checks, combinations of checks, etc. may be used as necessary and/or desired.

In one embodiment, an IR image/video may be used to check the image/video of the irises. In one embodiment, the IR image/video may be checked against historical data.

In step 1350, if the capture is live, in step 1360, a side image, video, etc. of the iris may be captured.

If the image is not a live image, the process may start over. In another embodiment, the account may be locked. This may occur after, for example, one failed attempt, a certain number of failed attempts, etc.

In step 1370, the side image may be verified. In one embodiment, the system may check for the clarity, transparency, etc. of the side view of cornea. In one embodiment, biometrics data for the cornea may be verified. In still another embodiment, if color contact lenses are detected, a check is made to determine if the color contacts block the light in the side view.

In step 1380, if the side image is verified, the user may be authenticated. In another embodiment, the user may proceed to additional authentication (biometrics and otherwise) as necessary and/or desired.

The disclosures of the following are hereby incorporated, by reference, in their entireties: U.S. patent application Ser. Nos. 13/492,126; 13/297,475; 11/337,563; 12/534,167; 10/867,103; 12/715,520; 10/710,315; 10/710,328; 11/294,785; and U.S. Pat. Nos. 8,028,896 and 7,117,365.

In one embodiment, a combination of both machine-based and human-based biometric authentication may be used.

Biometric matching algorithms may have limitations in certain modalities, and attackers, imposters, spoofers, etc. may leverage these limitations to design custom spoof attacks. For example, face recognition algorithms may have limitations in low lighting conditions, or in extremely bright conditions. In either situation, it may be difficult for the camera to "see" the features of the image that it is detecting, or for the algorithm to distinguish among biometric markers. Attackers may seek to exploit these limitations by, for example, wearing theater makeup, wearing masks, using pictures or replaying videos, etc. Although these attacks may be successful in defeating an algorithm-based system, the human brain has dedicated face processing regions that allows for a rapid and accurate processing to differentiate known faces from unknown faces. These processing regions may also detect theater make up, impersonations, etc. that an algorithm may not detect Thus, algorithm-based biometric security systems may be enhanced by including human cognition support.

In one embodiment, a system may incorporate a human cross-check as part of its biometric authentication process. For example, a human cross-check may be performed by individuals selected from a "confirmation list" of persons that may be selected by the user, the user's employer, the party ultimately responsible for the transaction, or at random.

In one embodiment, instead of a complete biometric and environment for a user (e.g., full facial features including hair, eyes, nose, ears, surroundings, etc.), biometrics "snippets" may be generated to protect the privacy of the user by providing only a part of the full biometric (e.g., eyes only, mouth only, face without background, upper portion of face, lower portion of face, etc.).

In another embodiment, a snippet may also be a short video clip that may be filtered to remove any private information (e.g., background, personal details, etc.) In still another embodiment, a snippet may be an audio record (after the details of the transaction are removed).

For example, after biometric data is captured from the user, biometrics data may be "cleaned" for privacy concerns by removing background information, non-biometric information (hair, etc.), background noise (e.g., surroundings, etc.), and all information that may not be related to the pending transaction. Multiple data snippets may then be created based on biometrics makers.

The system then may identify members of the user's confirmation list as well as the corresponding "connectivity score" for each member of the confirmation list. The connectivity score may consider, for example, a relationship between the user and reviewer (e.g., teammates, shared office, shared floor, shared building, family, friend, no relation, self-identification, etc.), length of time of the relationship, the last time the user and reviewer had met in person, the location of the user and reviewer (e.g., co-located in same building), etc.

For example, a person on the list who has worked with the user for 10 years will have a higher connectivity score than someone who has worked with the user for 1 month. Similarly, a person who does not know the user well, or at all (e.g., a low connectivity score) may be included on the confidence list only to verify that the user is not using makeup, a mask, a photo, etc. in an effort to defeat the algorithm. This person may not have a high connectivity score, but may be able to confirm that the image of the user is genuine.

After the automated biometrics authentication starts, the security system may initiate human based biometrics authentication by sending one or more snippets to one of more contacts from the confirmation list, and the one or more contacts are asked for confirmation. In one embodiment, this process may be "gamified" wherein the confirmation list members may receive points for a timely response (e.g., real-time or close to real-time), for reporting suspicious activities, etc.

In one embodiment, the one or more snippets may be transmitted to any suitable device, including mobile devices, desktop widgets, etc. In one embodiment, these devices may be registered to the reviewers, and the contacts may themselves be required to be authenticated to participate.

In one embodiment, each reviewer may receive one or more snippets that contain biometric data for one or more modality.

The system may then wait for one or more of selected contacts to respond. If a sufficient number of the selected contacts do not respond, or if the combined confidence level from the reviewers is below a predetermined threshold, additional contacts may be provided with the snippets.

In one embodiment, all selected contacts must confirm the identity or authenticity of the image of the user. In one embodiment, the confirmation must be above a predetermined confidence level threshold. In another embodiment, a majority may only need to confirm the identity or authenticity of the image of the user. The number of confirmations may depend, for example, on the risk and/or value of the requested transaction.

After the responses are received, the responses may be compiled based on modality and may be checked for consistency. For example, flags that were identified by more than one contact may lead to increased scrutiny. In cases where multiple users with high connectivity scores return low confidence scores, appropriate alarms may be created. Scores for individual modalities may be crossed checked with integrated biometrics modalities where multiple modalities are used.

The machine and human generated matching scores may then be merged, and the transaction may be authorized, provisionally authorized, denied, etc. or held for further processing. For example, different modalities and biometric markers may be ranked through human and machine-based biometrics authentication mechanisms. Depending on the modality and biometrics markers used, the system may receive confidence factors from a human-based authentication verification path where users rank the authentication by assigning confidence score and providing potential spoofing alerts, and from a machine-based authentication path where authentication algorithms may be used to calculate a confidence score.

In one embodiment, the transaction requested by the user may be provisionally authorized pending the confirmation by the one or more selected contacts.

Figure 14:
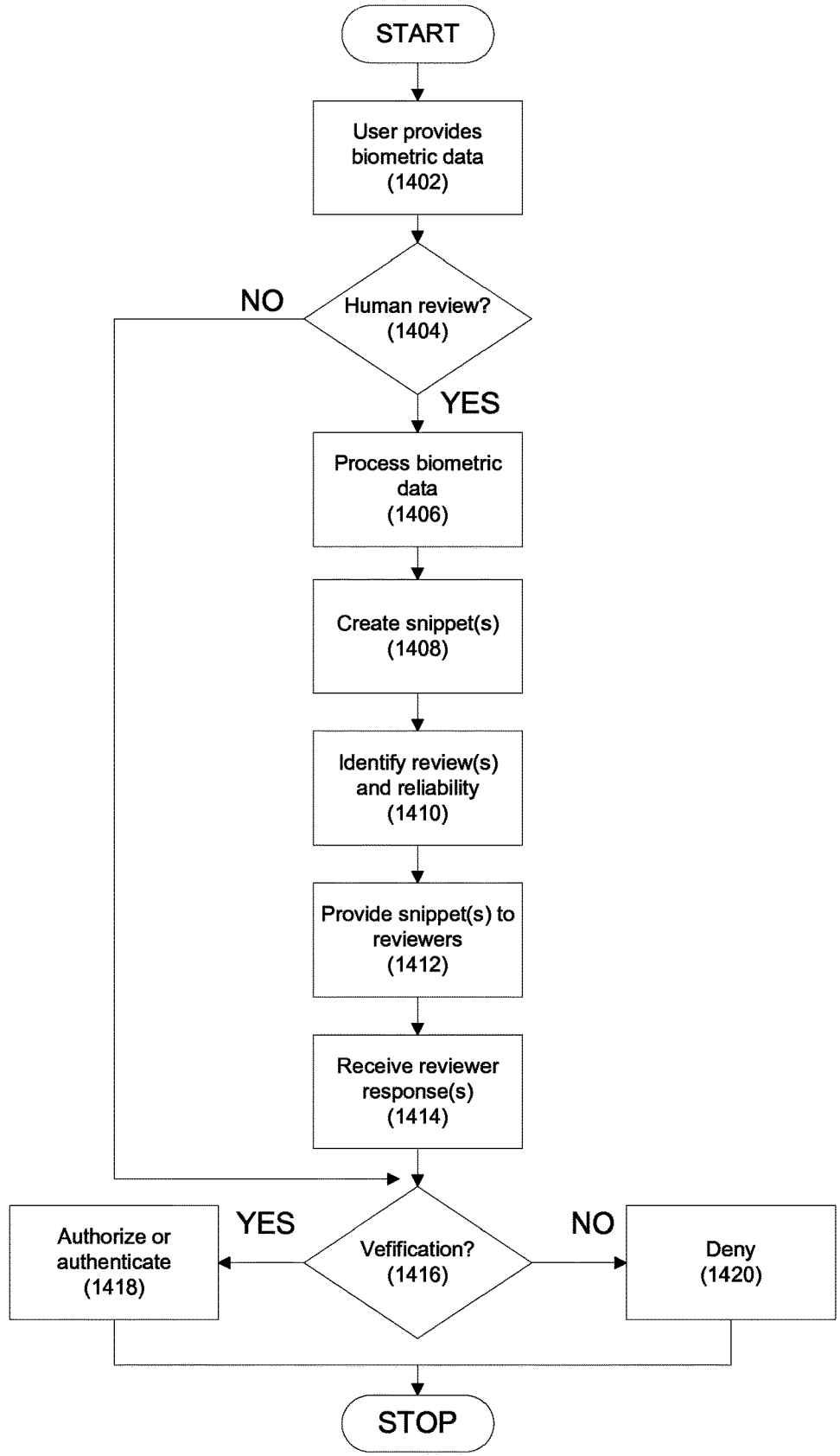
FIG. 14 is a flowchart depicting a method for multi-modal out-of-band biometric authentication through fused cross-checking technique according to one embodiment.

Referring to FIG. 14, a flowchart depicting a method for multi-modal out-of-band biometric authentication through fused cross-checking technique according to one embodiment is provided. In step 1402, a user may request authentication and/or authorization. In one embodiment, the authentication/authorization may be to access an account, to access an area, to conduct a transaction, etc. In one embodiment, biometric data, such as an image, voice, behavior, etc. may be captured from the user. In addition, background information (e.g., location data, environment data, device data, etc.) may be captured.

Next, in step 1404, the system may conduct an algorithmic review of the captured biometric data. This may be as described, above.

In one embodiment, the algorithmic review may include determining if human review is necessary. For example, the system may consider the reliability of the algorithms for the selected modality, the risk and/or value of the requested transaction, the time since the last human review of the user, or any other suitable consideration. In another embodiment, anomaly detection algorithms may trigger human-based biometric authentication in cases where the user data does not match the profile data. In another embodiment, high-security applications may automatically trigger a combination of human/machine verified biometric authentication due to the nature of the transaction.

If human review is necessary, in step 1406, the biometric data may be processed for human review. In one embodiment, this may involve removing any sensitive data, such as removing background information, non-biometric information (e.g., hair, clothing, etc.), background noise (e.g., surroundings, etc.), and all information that may not be related to the pending transaction.

In step 1408, at least one snippet may be generated. For example, a snippet of the user's eyes only, mouth only, face without background, lower portion of the user's face, upper portion of the user's face, etc. may be generated.

In one embodiment, the snippets may be created based on machine-created marker flags. For example, customized biometric post-processing algorithms may be used to identify snippets with unique characteristics that can be used for biometrics authentication. Such snippets may include high activity periods where the user speaks, blinks, moves, etc. Snippets that are suspicious, or outliers, may be extracted and not used for verification.

In one embodiment, the snippets may have custom durations. The durations may be based on, for example, human cognition, privacy concerns, the severity of the marker flags, etc. For example, snippets may have customized length to enable positive identification by human or machine-based paths. A voice recognition verification path may require a snippet long enough for it be verified by human path (e.g. in the order of seconds).

For human review, the snippet may include face/voice/iris/behavioral biometrics data that is also of a customized length to enable end users to verify the authenticity of the integrated biometrics snippet. Such snippets for human verification may be customized for human cognitive abilities through known science in the field and experimental analysis, historical data, or as necessary and/or desired. For example, snippets may be truncated to customized lengths to protect the user's privacy (e.g., voice snippets are truncated so that they do not reveal information on the transaction to be executed).

In another embodiment, snippets may be manually created from extracted data. This may be based on suspicious data or activity, anomalous behavior or other standard snippet creation techniques as described above.

In step 1410, one or more reviewers for the snippets may be identified. For example, the system may access a "confirmation list" for the user. This confirmation list may include individuals that know the user. In one embodiment, the individuals on the confirmation list may be identified by the user, by the employer, etc.

In one embodiment, the confirmation list may be automatically generated based on the known connectivity information. This may include, for example, enterprise and/or external social media connectivity information, the user's geographical collocation in terms of shared office spaces, the user's coworkers, project teammates, project management and other work connections, friends and family in trusted systems, etc. The algorithms may rank the connectivity strength, length of connection, how current the connection is, etc. to determine a "connectivity score" for each human reviewer. For example, if two users are connected through shared projects and office space for ten years and the connection is current, the connectivity score will reflect that confidence as compared to a new hire who has only connected with the user for the past two months and is located in a different city.

Each user may also be assigned a "confidence factor" based on their history of successfully identifying imposters and genuine biometrics authentication sessions. This may be achieved by collecting a historical profile of each human verifier and also through the gamification interface where the users collect points for successful authentications and identifying imposters. Gamification may also be achieved through the mobile device/applications that the users receive biometrics verification requests.

In one embodiment, random individuals that may have no relationship with the individual may be selected to review the snippets. In one embodiment, these individuals may simply be selected to confirm whether the snippet of the user appears to be genuine and not a spoofer (i.e., an imposter).

In one embodiment, the number of reviewers and/or threshold connectivity score for each reviewer may be determined based on, for example, the effectiveness of the algorithms for the selected modality, the risk and/or value of the requested transaction, the time since the last human review of the user, etc. For example, if a user has been using a home office for the past ten years and has no human reviewers with high connectivity scores, alternatives to face recognition, such as signature recognition, and/or additional reviewers may be requested.

In step 1412, once the reviewers and number of snippets are determined (note that the content of the snippets and the number of snippets provided to each reviewer may be different), the snippets may be distributed to the reviewers through available communication channels. In one embodiment, the snippets may be provided to the reviewers by email, instant message, text message, video message, or by any other suitable communication mode and/or channel. In one embodiment, the requests may be sent for each biometric verification path.

In one embodiment, the request for verification messages may be sent to mobile devices and request immediate verification (e.g., almost real-time) and processing of the request by the user to collect points (if used).

In one embodiment, some, or all, of the reviewers may be presented with the identity of the user with the snippets and asked to confirm the identity of the user. In another embodiment, some or all of the reviewers may be asked to confirm that the snippets appear to represent a real person.

The reviewers may review the snippets and may assign a certainty level to their review. The certainty level may be any suitable ranking, such as low-medium-high; a scale of 1-10, etc. In one embodiment, the reviewers may also mark any potential spoofs.

In step 1414, responses from the reviewers may be received. In one embodiment, all reviewers do not need to respond. For example, if one reviewer with a high connectivity score responds, that may be sufficient. The required number of responses, required connectivity score, required certainty levels, etc. may be based on, for example, the effectiveness of the algorithms for the selected modality, the risk and/or value of the requested transaction, the time since the last human review of the user, etc.

In one embodiment, if a sufficient number of reviewers do not respond, if the total confidence level does not exceed a confidence level threshold, if the total connectivity score does not exceed a connectivity score threshold, etc., the snippets may be sent to additional reviewers.

In one embodiment, each response may be weighted based on, for example, the reviewer's connectivity score, the reviewer's certainty level, etc. A combined score may then calculated.

In one embodiment, a consistency check among the received responses may be performed. In another embodiment, common flags, such as those associated with common issues, may be identified. For example, if more than one reviewer identifies anomalous data in the face recognition modality and returns flagged responses, additional security checks may be required.

As another example, if responses to voice biometric snippets are received, and multiple reviewers indicate suspicious voice data, the system may assess the activity as likely being spoofing. In one embodiment, a security flag may indicate such.

In step 1416, a verification check may be performed. In one embodiment, the algorithm-based scores and the human reviewer scores may be merged. In another embodiment, each score may be considered separately. The scores may be checked against a certain threshold. If the scores exceed the threshold, then in step 1418, the user may be authorized. If one of the scores does not exceed the threshold, in step 1420, the user may be denied.

In another embodiment, additional review, either human or machine, may be required.

Figure 15:
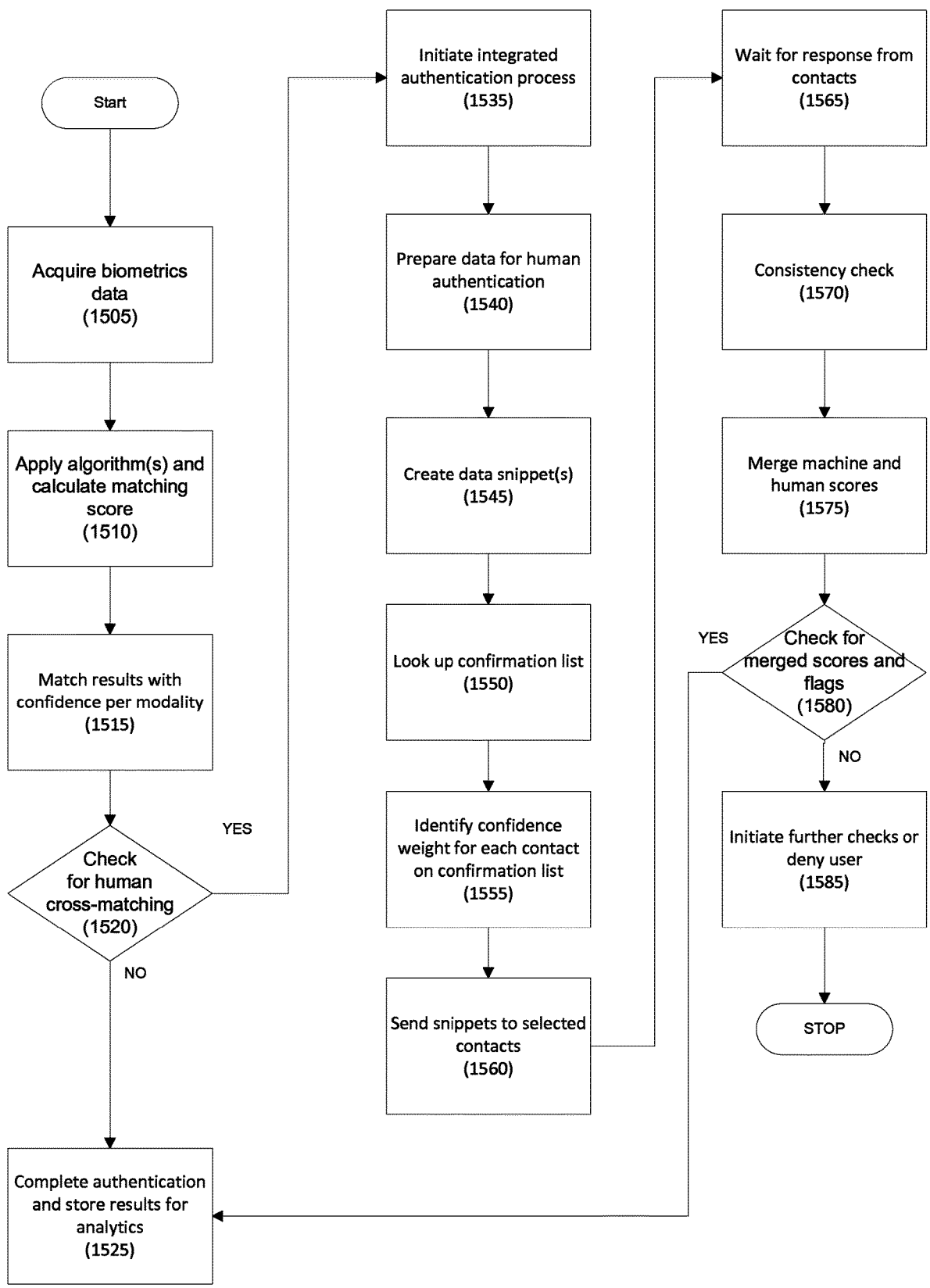
FIG. 15 is a flowchart depicting a method for multi-modal out-of-band biometric authentication through fused cross-checking technique according to another embodiment.

Referring to FIG. 15, a detailed flowchart depicting a method for multi-modal out-of-band biometric authentication through fused cross-checking technique according to one embodiment is provided.

In step 1505, biometric data may be acquired from the user.

In step 1510, multi-modal biometric algorithms may be run on the biometric data to calculate a matching score.

In step 1515, different modalities and biometric markers may be ranked through human and machine-based biometrics authentication mechanisms. Depending on the modality and biometrics markers used in authentication, the system may receive confidence factors from both (1) human-based authentication verification, where users rank the authentication by assigning confidence score and providing potential spoofing alerts, and (2) biometrics authentication through integrated multi-modal authentication algorithms are used to calculate confidence score. For each modality and marker used in authentication, the confidence factors of individual paths are considered. For example, for a human biometrics authentication verification path H may be provided as follows:

$$\Sigma(\forall k: \text{Bio Marker or modality})\text{Confidence score from user } C(i,k)*\text{Connection Weight } W(i,j,k)/\text{Avg (Connection Weight)}*\text{Threshold for Authentication session})$$ indicates the confidence score of the authentication session;

where:

C(i, k) is confidence score from user i for bio marker or modality k;

W (i, j, k) indicates the connection weight between connection i, j for the modality/bio marker of interest k;

Avg Connection weight is the connection weight of connection for the user;

Threshold for Authentication session provides a system defined factor to threshold—it may be specific to the type of transaction, to employee privileges, other corporate security settings.

For a computer verification Path C, a matching score may be provided by the biometrics authentication algorithm.

The Overall Confidence Score may be the sum of the following:

$$(\forall i: \text{Bio Marker or modality})CH(i)*SH(i)+CC(i)*SC(i).$$

For each bio marker or modality i, a confidence score and spoofing score may be calculated per path and such scores are combined across paths where:

CH(i) is the confidence score of path H for modality or bio marker i, SH(i) is the spoofing confidence score of Path H for modality i;

CC(i) is the confidence score of Path C for modality i and SC(i) is the spoofing confidence score of Path C for modality i.

The equation may be extended to other paths with the addition of CA(i)*SA(i) for alternative authentication verification paths.

In step 1520, a determination may be made as to whether human cross-checking is necessary. This decision may be based on the risk, authorization sought, value of the transaction, prior experience with the user, policies, etc.

In step 1525, if human cross-checking is not necessary, authentication is complete and the results may be stored for analytics.

In step 1535, if human cross-checking is necessary, the integrated authorization process is initiated.

In step 1540, the biometric data may be prepared. This may be similar to step 1406, discussed above. In one embodiment, the data may first be cleared for privacy. This may involve one or more of removing all background images, removing non-biometrics information (e.g., hair, accessories, etc.), removing all background noise, and removing all information related to location, transaction information, etc. Additional privacy clearing may be performed as necessary and/or desired.

In step 1545, one or more data snippet may be created. This may be similar to step 1408, discussed above. In one embodiment, the snippets may be created based on machine-created marker flags. For example, N snippets each having a duration of $t_N$ may be created. This may be in single mode or in integrated mode. In one embodiment, $t_N$ may be a custom duration based on needs for human cognition, privacy, and marker flag severity.

In step 1550, the user's confirmation list may be retrieved. This may be similar to step 1410, discussed above. In one embodiment, the confirmation list may be stored at the corporate security server, or any other location. In another embodiment, the user may identify individuals for confirmation purposes at the time authentication is sought.

In one embodiment, the contacts may also be users who themselves may be verified through human interaction.

In step 1555, the connectivity score for each contact in the user's confirmation list may be retrieved. This may also be similar to step 1410, discussed above.

In step 1560, the N snippets may be sent to M selected contacts from the confirmation list. This may also be similar to step 1412, discussed above. In one embodiment, this may be sent by any suitable communication channel, such as personal mobile devices, desktop widgets, etc. In one embodiment, the snippets may be sent in real-time. In one embodiment, the contacts may be asked for confirmation scores.

In one embodiment, the process may be "gamified," whereby the contacts may report suspicious parts for points. In one embodiment, the points may be awarded only when the suspicious activity is confirmed. For example, users may gain points for each successful verification session. They may also gain extra points for identifying spoofs, for responding immediately, etc. Each user may have verification profiles and rankings based on their historical successes. For example, some users may be higher ranked in face recognition or behavioral biometrics while others may be higher ranked in voice biometrics.

Contacts may also be asked to review overall biometrics authentication session data, such as where a user is connecting from GPS data, time for authentication, the request for transaction, length of the session, etc. to potentially detect anomalies.

Contacts may also review the environmental factors (such as background noise, lighting, etc.) to completely disqualify the biometrics authentication session.

In step 1565, responses from the contacts may be received. This may be similar to step 1414, above. In one embodiment, if a sufficient number of contacts do not respond, if the total confidence weight does not exceed a confidence weight threshold, etc. the snippets may be sent to additional contacts.

In step 1570, a consistency check among the received responses may be performed. This may be similar to step 1416, above. For example, if two high connectivity score contacts have significantly different certainty levels, such as one indicating an unusually low certainty in voice biometrics and high certainty in face biometrics and, while the other is exactly the opposite, the system may identify this as a potential inconsistency.

In step 1575, a verification check may be performed. This may be similar to step 1416, above. In one embodiment, the algorithm-based scores and the human reviewer scores may be merged. In another embodiment, each score may be considered separately.

In one embodiment, the verification check may include the application of weighing factors for spoof detection. One such embodiment is illustrated in FIG. 16, described below.

In step 1580, a check for merged scores and flags is performed. In one embodiment, the scores may be checked against a certain threshold. If the scores exceed the threshold, then in step 1525, the user may be authorized and the results may be store for analytics. If one of the scores does not exceed the threshold, in step 1585, the user may be denied or additional checks may be performed.

Figure 16:
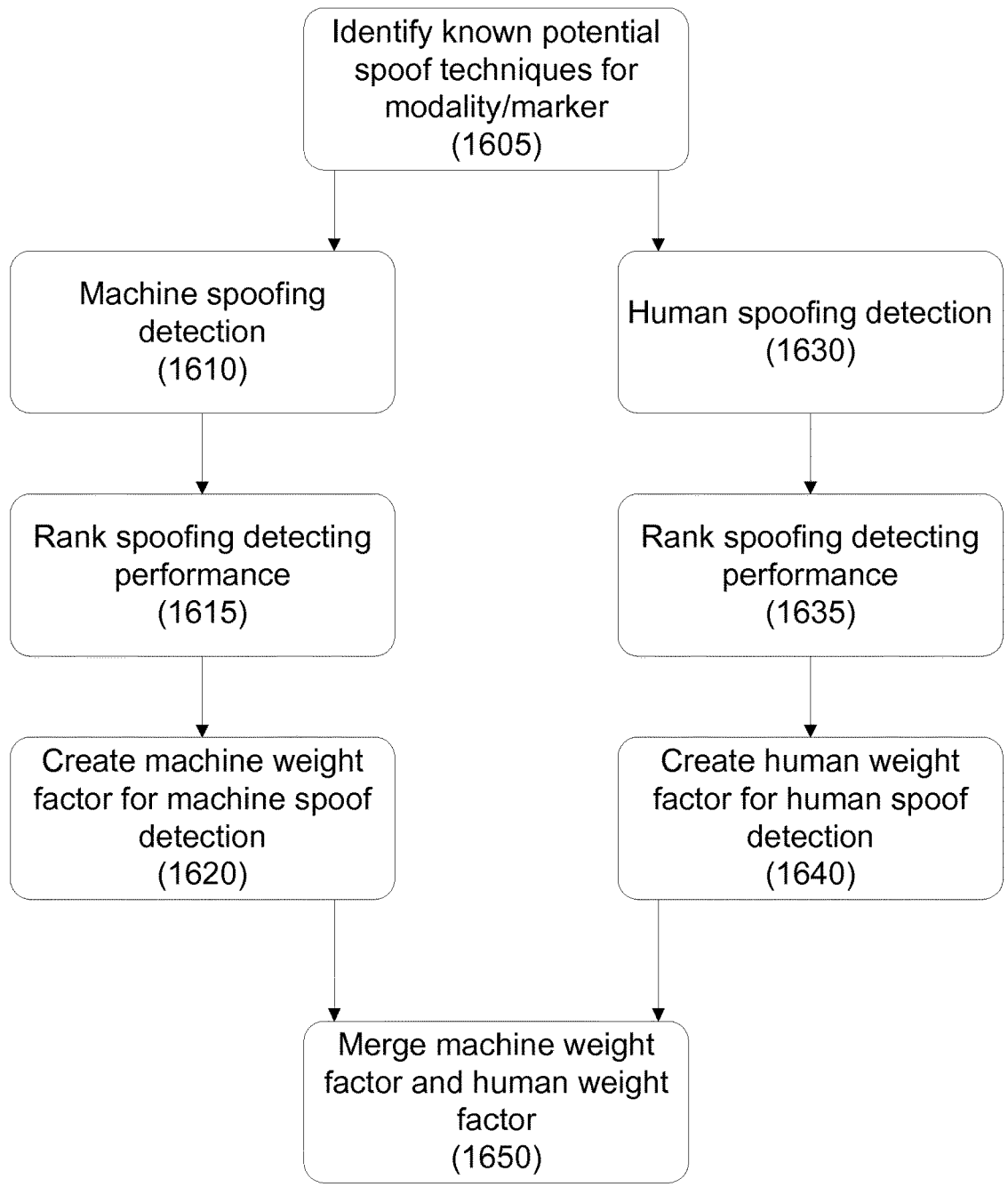
FIG. 16 is a flowchart depicting a method of weighing potential spoof techniques according to one embodiment.

Referring to FIG. 16, a method of factoring in strengths and limitations of automated and human biometrics authentication processes is provided. In step 1605, each biometrics modality and/or biometrics marker is taken into consideration in terms of potential spoof techniques. For example, spoof techniques for human review (e.g., makeup, photos, etc.) and machine review (e.g., playback, etc.) may be identified.

In step 1610 and 1630, each biometrics marker/modality may be evaluated using historical biometrics authentication data and targeted experiments. In step 1610, for machine spoof techniques, historical and/or experimental data for spoof attempts is retrieved, and, in step 1615, the effectiveness of the spoof detection technique/algorithm is determined.

In step 1620, historical and experimental data may be used to rate the success rate and spoofing risk for individual modalities and/or markers for machine-based biometrics authentication. Based on the effectiveness, a machine weight factor for the spoof detection techniques may be created.

For example, machine-based biometrics authentication is experimentally more successful in analyzing integrated biometrics that rely on the cross-references and precise timing among multiple modalities. Such timing is typically in the order of milliseconds and not suitable for human detection. Machine-based biometrics authentication is significantly higher accuracy for iris recognition compared to human based alternative.

A similar process is performed for human spoof detection in steps 1630-1640.

In step 1650, the machine weight factor and the human weight factor may be merged. Historical and experimental data may highlight the strengths and weaknesses of human verification. For example, face biometrics are typically rapidly and accurately processed by high connectivity individuals, including identifying spoofing techniques, such as theater or professional makeup, distorted/imperfect voice snippets (e.g. when user has nasal congestion, cold, etc.), etc.

Figure 17:
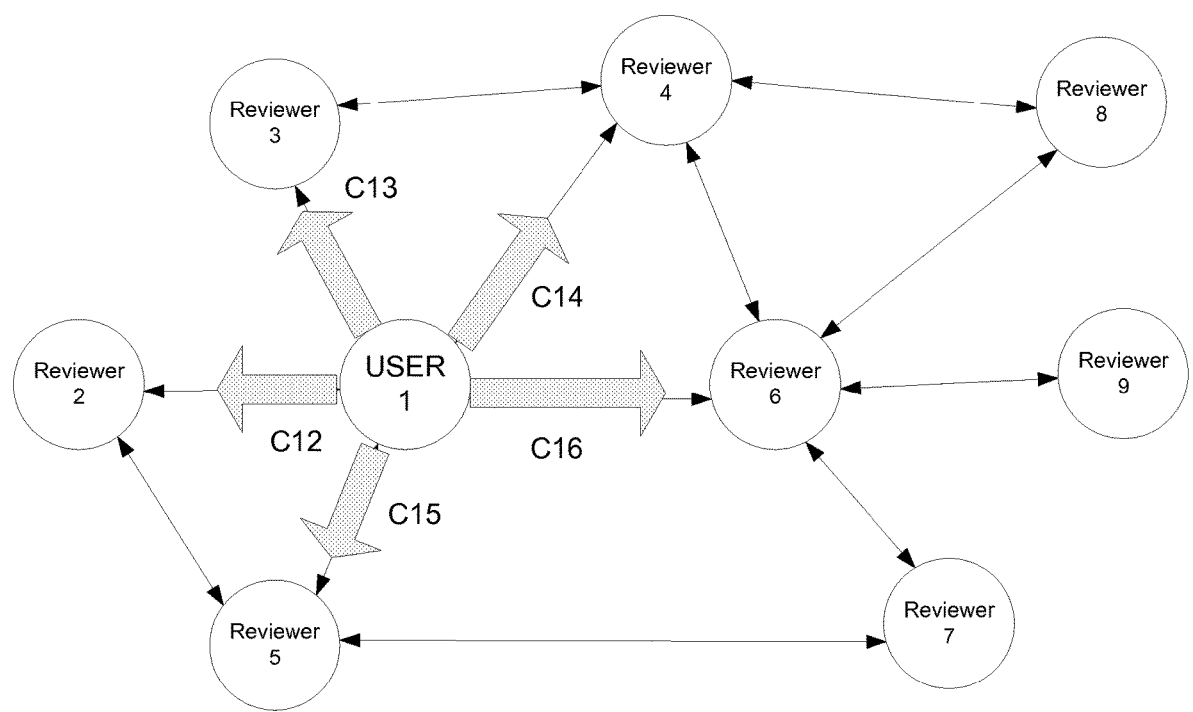
FIG. 17 is a graphical representation of a method for multi-modal out-of-band biometric authentication through fused cross-checking technique according to another embodiment.
Figure 18:
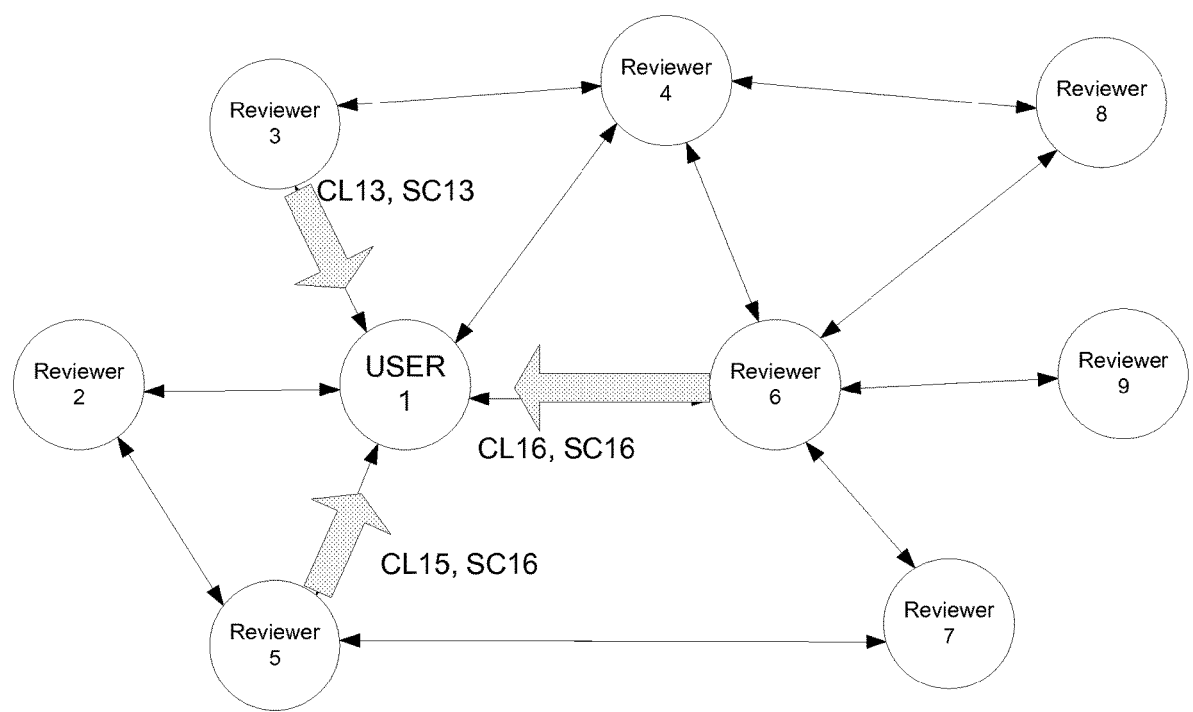
FIG. 18 is a graphical representation of a method for multi-modal out-of-band biometric authentication through fused cross-checking technique according to another embodiment.

Referring to FIGS. 17 and 18, an example of the use of a "confirmation list" are provided according to embodiments. In this example, there are nine participants, with participant 1 being the user seeking authentication, and participants 2-9 being potential reviewers. As this is exemplary only, greater or fewer participants may be provided.

In one embodiment, the system may create connectivity graphs, such as that in FIG. 17. The biometrics confirmation lists, connectivity and user profile information may reside, for example, on the server back-end of the system and may be represented in graph database or other alternative systems. The system may check the accuracy of this graph with internal "who-knows-whom" databases, human resources ("HR") records, etc. In another embodiment, the system may check social media connections, such as Facebook, LinkedIn, etc. The connectivity graphs may be maintained with updated connectivity information and biometrics authentication sessions.

In one embodiment, each user may be represented as an "entity" in the graph, and each connection in the connectivity list may be represented as an line having one or two arrows in the graph. In one embodiment, connections may be unidirectional. For example, a reviewer may be able to authenticate the user, but the user may not be able to authenticate the reviewer.

For example, if the system seeks to verify a biometrics authentication session for User 1, the snippets may be provided to some or all of User 1's direct connections, such as Reviewers 2, 3, 4, 5 and 6. In one embodiment, the snippets may be provided in real-time with a request to respond within a specific duration. The identity and number of reviewers may be determined based on, for example, the transaction type, risk, level of authentication sought, etc.

Each user/reviewer relationship may have a connectivity score, such as C12 (representing the connectivity strength— the strength of the relationship between User 2 and User 1). As noted above, the connectivity score may be based on a number of factors, including, for example, the relationship between the users (e.g., teammates, shared office, shared floors, shared building, etc.), length of relationship, last contact, self-assigned connection, and prior successful checks.

Conversely, C21 represents the strength of the relationship between User 1 and User 2, which may be different from C12. This may be due to a number of factors, such as each user's self-assignment list, historical data on successful biometrics session verification, etc. For example, User 2 may have vision or hearing challenges, and, despite similar connectivity with User 1, C12 will be different from C21.

Note that the connectivity score may or may not be provided with the snippet.

In one embodiment, each user may be associated with a biometric verification history profile indicating how successful the user was at identifying known parties and/or spoof attempts. This may be tracked by collecting points from the gaming interface. For example, if User K has successfully identified five spoofing attempts that others could not, User K may be awarded with extra points corresponding to this success. As a result when a new biometric verification is initiated, User K may have a high likelihood of being selected as a verifier/reviewer.

In the example of FIG. 17, User 1's snippets are illustrated as being sent to reviewers 2, 3, 4, 5 and 6.

Referring to FIG. 18, an illustration of a response to User 1's review request is provided. Reviewers 3, 5 and 6 have all responded to the request, while Reviewers 2 and 4 have not.

In one embodiment, each user's response may include a certainty level (CL), a session confidence score (SC), and a spoof indicator (S). As noted above, the certainty level represents each reviewer's certainty in his or her assessment of the snippets. For User 3, this value is CL13.

Next, the session confidence score of the authentication verification. This may be based on the background noise, lighting, etc. For User 3, this value SC13.

In one embodiment, the session confidence score may be part of the certainty level.

Next, a spoofing indicator may be provided. For example, the spoofing indicator may indicate whether or not the reviewer thinks that the snippet represents a spoof. The spoof indicator may be a flag, a comment, etc.

The total weight of the three responses (from Users 3, 5 and 6) responses may be calculated as C13\*CL13\*SC13+ C15\*CL15\*SC15+C16\*CL16\*SC16.

In one embodiment, if this total weight exceeds a threshold, then the process may continue. Session confidence scores are cross checked and factored into the total weight factors.

In one embodiment, the threshold may be based on the transaction type, risk, level of authentication sought, etc.

In one embodiment, if the total weight does not exceed the threshold, the system may wait for responses from the non-responding reviewers, additional reviewers may be identified, the user may be provisionally approved, etc. The action taken may depend on the risk, value, etc. associated with the authorization.

If the total weight meets or exceeds the threshold, confidence scores for each response may be considered. For example, each response may include the responder's assigned certainty levels, such as CL13 for reviewer 3, CL15 for reviewer 5, CL16 for reviewer 6, etc. In one embodiment, the certainty levels of one or more (or all) of the reviewers may be checked for consistency.

In one embodiment, if a reviewer provided special comments, details on certainty level, session confidence, or other notes, this information may be stored for security processing.

Figure 19:
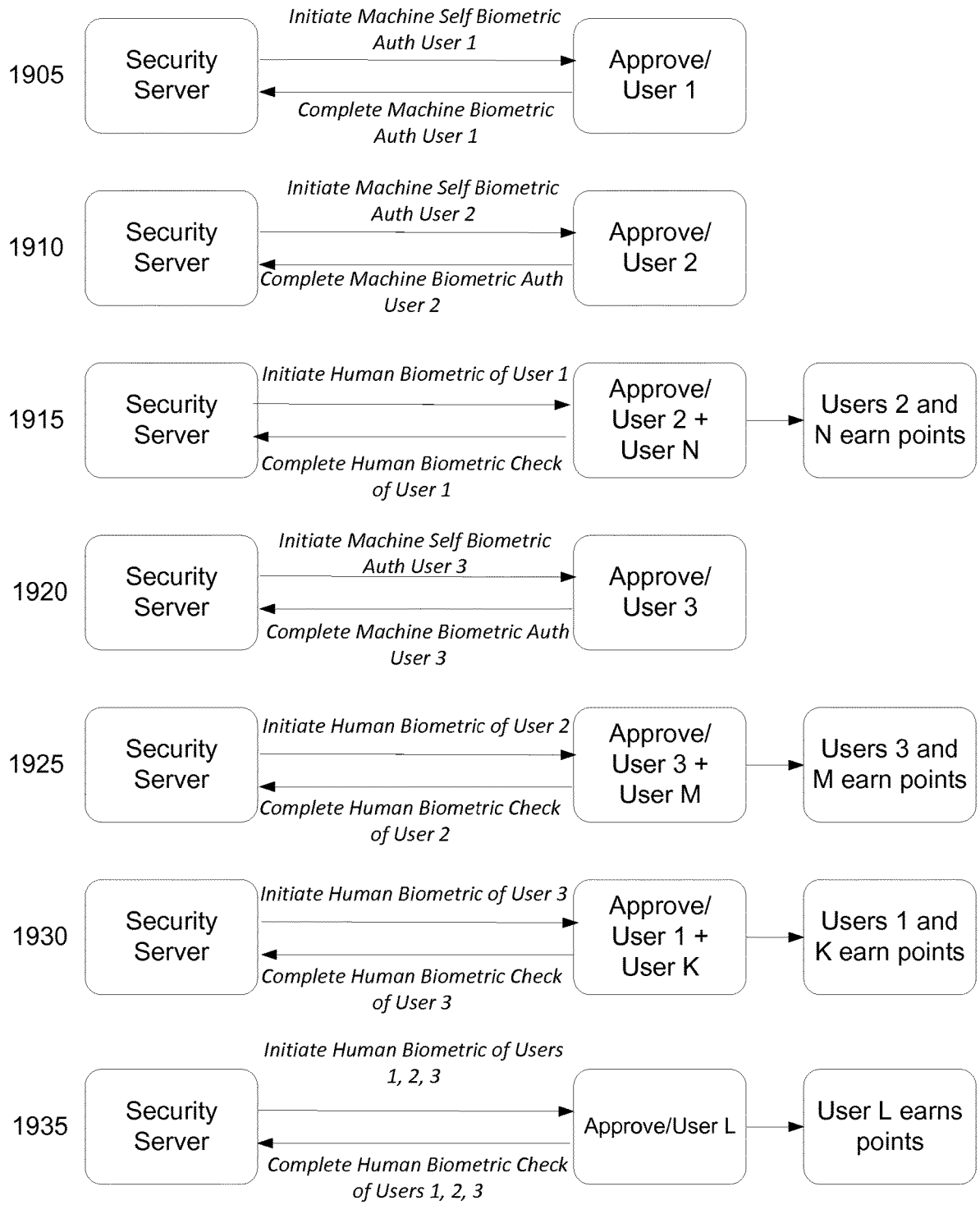
FIG. 19 depicts a process flow of a high-risk transaction biometrics cross-checking process according to one embodiment.
Figure 20A:
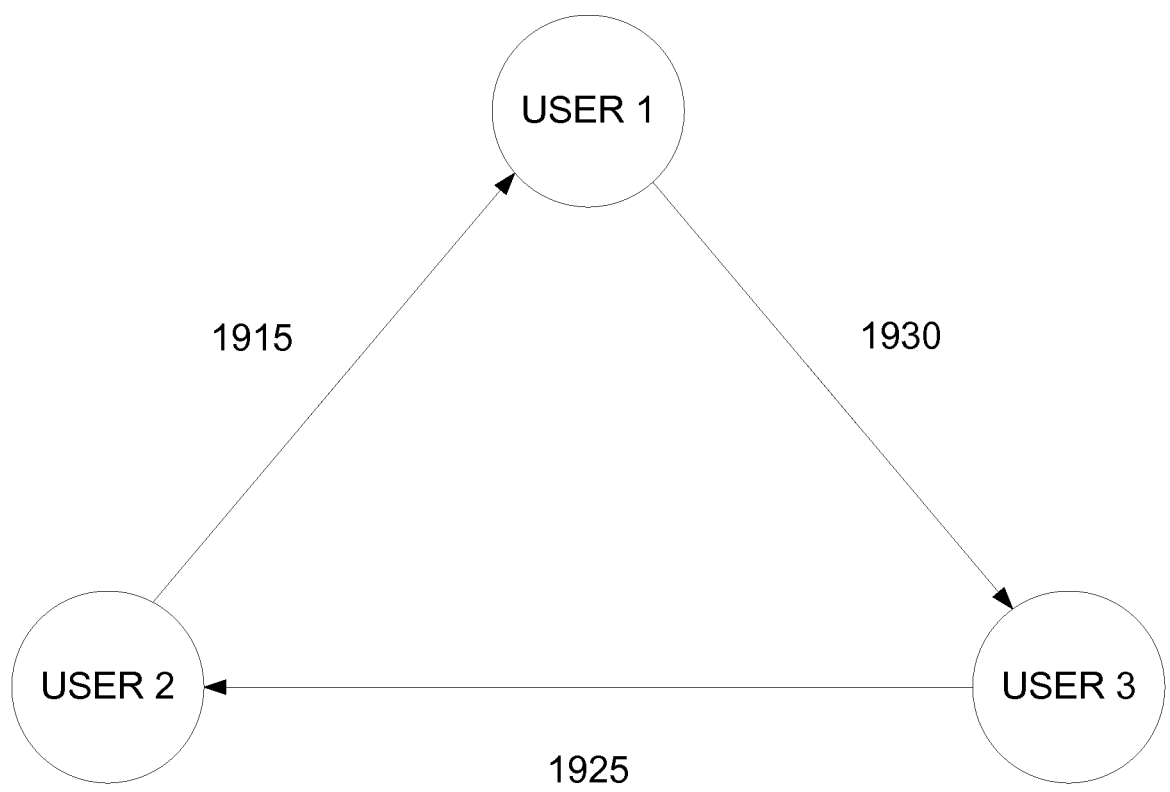
FIGS. 20A and 20B are graphical representations of aspects of a process flow of a high-risk transaction biometrics cross-checking process according to one embodiment.
Figure 20B:
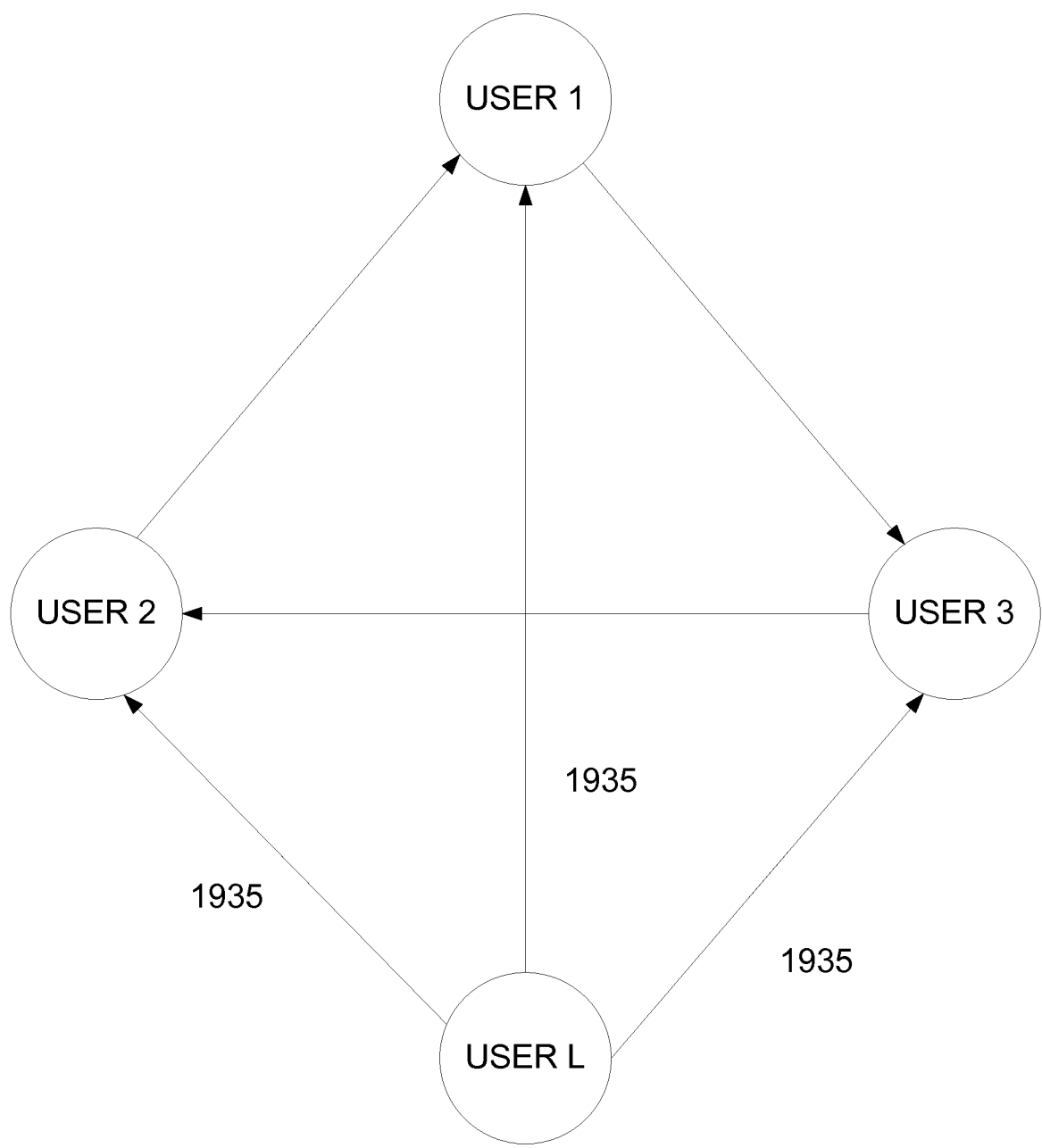

Referring now to FIG. 19, a process flow of a high-risk transaction biometrics cross-checking process according to one embodiment is provided. FIGS. 20A and 20B graphically reflect aspects of this process flow, with FIG. 20A reflecting the complementary authorization of users 1, 2 and 3, and FIG. 20B reflecting the authorization of users 1, 2, and 3 by user L.

First, in step 1905, User 1 may be authenticated by the security server using machine analysis of biometrics as described above.

In step 1910, User 2 may be also authenticated by the security server using machine analysis of biometrics as described above.

In step 1915, User 1 may be authenticated by User 2 using human cross-checking, as described above. As a result, User 2 may earn points.

In one embodiment, additional users (e.g., User N) may also authenticate User 1 using human cross-checking as described above, and may earn points.

In step 1920, User 3 may be authenticated by the security server using machine analysis of biometrics as described above.

In step 1925, User 2 may be authenticated by User 3 (and Users M) using human cross-checking, as described above. As a result, User 3 and Users M may earn points.

In step 1930, User 3 may be authenticated by User 1 (and Users K) using human cross-checking, as described above. As a result, User 1 and Users K may earn points.

In step 1935, User L may authenticate Users 1, 2, and 3 using human cross-checking, as described above. In one embodiment, User L may be a supervisor for Users 1, 2 and 3. In another embodiment, User L may be randomly selected. Any suitable User L may be used as necessary and/or desired.

As a result, User L may earn points.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for integrated authentication, comprising:
    in an information processing apparatus comprising at least one computer processor:
        receiving, from a user, identifying data;
        performing machine-based identity matching on the identifying data;
        based on the machine-based matching, determining that human confirmation of the user's identity is necessary;
        accessing a connectivity graph stored in memory to identify at least one contact having a connection with the user in the connectivity graph;
        identifying a connection and a connectivity score between the identified contact and the user;
        returning the connectivity score for the identified connection;
        sending at least a portion of the identifying data for the user to the contact based on the connectivity score;
        receiving, from the at least one contact, human identity confirmation information; and
        the at least one computer processor authenticating the user based on both the machine-based matching and the human identity confirmation information;
    wherein the connectivity graph is generated by:
        receiving, from a database, a plurality of contacts for the user;
        identifying a connection between the user and each of the plurality of contacts;
        identifying a connectivity score for each connection;
        generating a connectivity graph for the user, wherein each contact is represented as a node in the connectivity graph, and the connections are represented by edges between the nodes, and the edges are associated with their connectivity scores; and
        storing the connectivity graph in the memory.

2. The method of claim 1, wherein the connectivity score is based on at least one of a relationship between the user and the contact, a length of a relationship between the user and the contact, a date of the last in-person interaction between the user and the contact, and a location of the user and the contact.

3. The method of claim 1, wherein each node is associated with a verification history profile, wherein the verification history profile identifies how successful the contact associated with the node is at identifying humans or spoof attempts.

4. The method of claim 1, wherein the connection comprises a relationship type.

5. The method of claim 1, wherein the relationship type comprises at least one of teammates, shared office, shared floor, shared building, family, friend, and no relationship.

6. The method of claim 1, wherein the database comprises a human resources database identifying business connections with at least some of the contacts.

7. The method of claim 1, wherein the database comprises a social media database identifying social connections with at least some of the contacts.

8. The method of claim 1, wherein the connection is unidirectional, and the connectivity score is associated with the direction of the connection.

9. The method of claim 1, wherein the connection is bidirectional, and each direction is associated with a different connectivity score.

10. The method of claim 1, further comprising;
    updating a verification history profile for the contact based on a result of the machine-based matching.

11. A method for integrated biometric authentication, comprising:
    in an information processing apparatus comprising at least one computer processor:
        receiving, from a user, biometric data;
        performing machine-based biometric matching on the biometric data;
        based on the machine-based biometric matching, determining that human confirmation of the user's identity is necessary;
        accessing a connectivity graph stored in memory to identify at least one contact having a connection with the user in the connectivity graph;
        identifying a connection and a connectivity score between the identified contact and the user;
        returning the connectivity score for the identified connection;
        sending at least a portion of the biometric data for the user to the contact based on the at least a portion of the biometric data for the user;
        receiving, from the at least one contact, human identity confirmation information; and
        authenticating the user based on both the machine-based biometric matching and the human identity confirmation information;
    wherein the connectivity graph is generated by:
        receiving, from a database, a plurality of contacts for the user;
        identifying a connection between the user and each of the plurality of contacts;
        identifying a connectivity score for each connection; and
        generating the connectivity graph for the user, wherein each contact is represented as a node in the connectivity graph, and the connections are represented by edges between the nodes, and the edges are associated with their connectivity scores.

12. The method of claim 11, further comprising:
    weighting the human identity confirmation information based on the connectivity score.

13. The method of claim 11, wherein the connectivity score is based on at least one of a relationship between the user and the contact, a length of a relationship between the user and the contact, a date of the last in-person interaction between the user and the contact, and a location of the user and the contact.

14. The method of claim 12, wherein each node is associated with a biometric verification history profile, wherein the biometric verification history profile identifies how successful the contact associated with the node is at identifying humans or spoof attempts.

15. The method of claim 11, wherein the connection comprises a relationship type, wherein the relationship type comprises at least one of teammates, shared office, shared floor, shared building, family, friend, and no relationship.

16. The method of claim 11, wherein the database comprises a human resources database identifying business connections with at least some of the contacts.

17. The method of claim 11, wherein the database comprises a social media database identifying social connections with at least some of the contacts.

18. The method of claim 11, wherein the step of determining that human confirmation of the user's identity is necessary comprises:
   determining a reliability of at least one algorithm in comparing the biometric data to a stored biometric profile of the user; and
   initiating human confirmation of the user's identity in response to the reliability of at least one algorithm being below a predetermined threshold.

19. The method of claim 11, further comprising:
   updating a biometric verification history profile for the contact based on a result of the machine-based biometric matching.

* * * * *